United States Patent
Amin et al.

(10) Patent No.: US 8,898,215 B2
(45) Date of Patent: Nov. 25, 2014

(54) HIGH-RADIX MULTIPLIER-DIVIDER

(75) Inventors: Alaaeldin Amin, Dhahran (SA); Muhammad Waleed Shinwari, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 784 days.

(21) Appl. No.: 13/151,099

(22) Filed: Jun. 1, 2011

(65) Prior Publication Data

US 2011/0231468 A1  Sep. 22, 2011

Related U.S. Application Data

(63) Continuation-in-part of application No. 11/819,749, filed on Jun. 28, 2007, now abandoned.

(51) Int. Cl.
  *G06F 7/52* (2006.01)
  *G06F 7/537* (2006.01)
  *G06F 7/53* (2006.01)
  *G06F 7/72* (2006.01)

(52) U.S. Cl.
  CPC ............. *G06F 7/5375* (2013.01); *G06F 7/53* (2013.01); *G06F 7/72* (2013.01)
  USPC .......................................... 708/656; 708/504

(58) Field of Classification Search
  CPC ...................................................... G06F 7/535
  USPC .................. 708/490, 504, 650, 653, 656
  See application file for complete search history.

(56) References Cited

U.S. PATENT DOCUMENTS

| 5,105,378 A | 4/1992 | Mori |
| 5,132,925 A | 7/1992 | Kehl et al. |
| 5,144,574 A | 9/1992 | Morita |
| 5,646,877 A | 7/1997 | Mahant-Shetti et al. |
| 5,793,659 A | 8/1998 | Chen et al. |
| 5,999,962 A | 12/1999 | Makino |
| 6,151,393 A | 11/2000 | Jeong |

(Continued)

FOREIGN PATENT DOCUMENTS

| JP | 4-54633 | 2/1992 |
| JP | 6-230938 | 8/1994 |

OTHER PUBLICATIONS

Atkins, D., "Higher-Radix Division Using Estimates of the Divisor and Partial Remainders", *IEEE Transactions on Computers*, vol. C-17, No. 10, Oct. 1968, pp. 925-934.

(Continued)

*Primary Examiner* — Chuong D Ngo
(74) *Attorney, Agent, or Firm* — Richard C. Litman

(57) ABSTRACT

The high-radix multiplier-divider provides a system and method utilizing an SRT digit recurrence algorithm that provides for simultaneous multiplication and division using a single recurrence relation. When A, B, D and Q are fractions (e.g., $Q=0 \cdot q_{-1} q_{-2} \ldots q_{-n}$), then the algorithm provides for computing $$S = \frac{AB}{D}$$

to yield a w-bit quotient Q and w-bit remainder R by: (1) determining the next quotient digit $q_{-j}$ using a quotient digit selection function; (2) generating the product $q_{-j}D$; and (3) performing the triple addition of $rR_{j-1}$, $(-q_{-j}D)$ and $$b_{-(j-1)}\left(\frac{A}{r}\right)$$

where $R_0=b_{-1}A_r^{-1}$. The recurrence relation may be implemented with carry-save adders for computation using bitwise logical operators (AND, OR, XOR).

7 Claims, 9 Drawing Sheets

(56) References Cited

U.S. PATENT DOCUMENTS

| | | |
|---|---|---|
| 6,625,633 B1 | 9/2003 | Hirairi |
| 6,847,986 B2 | 1/2005 | Inui |
| 7,057,440 B2 | 6/2006 | Yang et al. |
| 2001/0025293 A1 | 9/2001 | Inui |
| 2002/0114449 A1 | 8/2002 | Cheng et al. |
| 2003/0018678 A1 | 1/2003 | Matula et al. |
| 2004/0010530 A1 | 1/2004 | Freking et al. |

OTHER PUBLICATIONS

Amin, A. and Shinwari, M.W., "High-Radix Multiplier-Dividers: Theory, Design and Hardware", *IEE Transactions on Computers*, vol. 59, No. 8, Aug. 2010, pp. 1009-1022.

http://islab.oregonstate.edu/papers/04Tawalbeh.pdf "A Novel Unified Algorithm and Hardware Architecture for Integrated Modular Division and Multiplication in GF(p) and GF(2") Suitable for Public Key Cryptography" retrieved on Jul. 17, 2006.

Lang et al., "Very High Radix Division with Selection by Rounding and Prescaling", *IEEE*, 1993, pp. 112-119.

Antelo et al., "Digit-Recurrence Dividers with Reduced Logical Depth", *IEEE Transactions on Computers*, vol. 54, No. 7, Jul. 2005, pp. 837-851.

Ercegovac, "On-the-Fly Rounding", *IEEE Transactions on Computers*, vol. 41, No. 12, Dec. 1992, pp. 1497-1503.

Pan et al., "High-Radix SRT Division with Speculation of Quotient Digits", *IEEE*, 1995, pp. 479 484.

Example

$r = 2, n = 8, A = 43, B = 173$ and $D = 93$.

Calculate $43 * 173 / 93$ $= 00101011 * 10101101 / 01011101$

```
                  Q = 0. 1 1̄ 0 1 0 0 0 0
  .0 1 0 1 1 1 0 1 | 0 0 . 0 0 0 1 0 1 0 1 1
                    0 0 . 0 0 1 0 1 0 1 1 0    (Shifted)
                    1 1 . 1 0 1 0 0 0 1 1 0    (2's comp.) → q₋₁ = 1
                    0 0 . 0 0 0 0 0 0 0 0 0
                    1 1 . 1 1 0 0 1 1 1 0 0
                    1 1 . 1 0 0 1 1 1 0 0 0    (Shifted)
                    0 0 . 0 1 0 1 1 1 0 1 0    → q₋₂ = 1̄ = -1
                    0 0 . 0 0 0 1 0 1 0 1 1
                    0 0 . 0 0 0 0 1 1 1 0 1
                    0 0 . 0 0 0 1 1 1 0 1 0    (Shifted)
                    0 0 . 0 0 0 0 0 0 0 0 0    → q₋₃ = 0
                    0 0 . 0 0 0 0 0 0 0 0 0
                    0 0 . 0 0 0 1 1 1 0 1 0
                    0 0 . 0 0 1 1 1 0 1 0 0    (Shifted)
                    1 1 . 1 0 1 0 0 0 1 1 0    → q₋₄ = 1
                    0 0 . 0 0 0 1 0 1 0 1 1
                    1 1 . 1 1 1 1 0 0 1 0 1
                    1 1 . 1 1 1 0 0 1 0 1 0    (Shifted)
                    0 0 . 0 0 0 0 0 0 0 0 0    → q₋₅ = 0
                    0 0 . 0 0 0 1 0 1 0 1 1
                    1 1 . 1 1 1 1 1 0 1 0 1
                    1 1 . 1 1 1 1 0 1 0 1 0    (Shifted)
                    0 0 . 0 0 0 0 0 0 0 0 0    → q₋₆ = 0
                    0 0 . 0 0 0 0 0 0 0 0 0
                    1 1 . 1 1 1 1 0 1 0 1 0
                    1 1 . 1 1 1 0 1 0 1 0 0    (Shifted)
                    0 0 . 0 0 0 0 0 0 0 0 0    → q₋₇ = 0
                    0 0 . 0 0 0 1 0 1 0 1 1
                    1 1 . 1 1 1 1 1 1 1 1 1
                    1 1 . 1 1 1 1 1 1 1 1 0
                    0 0 . 0 0 0 0 0 0 0 0 0
                    1 1 . 1 1 1 1 1 1 1 1 0    (Shifted)
                    0 0 . 0 1 0 1 1 1 0 1 0    → q₋₈ = 0
              Rₙ = 0 0 . 0 1 0 1 1 1 0 0 0
```

Correction:
1 - Add N (= 93) to the Remainder.
2 - subtract ulp (unit in least position) from the quotient Q.

$173 * 43/93 \Rightarrow Q = 0.1\bar{1}010000 - 0.00000001$ $= 0.01001111 \Rightarrow Q = 79$, and $R = 2^n R^{(n)} = (01011100)_2 = 92$

*Fig. 2*

| Iteration i # | CSA1 (PS-Input) | CSA1 (PS-Input) | CSA1(bjA'/r - Input) b(-i-1)*A/r | CSA2(Sum1 - Input) | CSA2(Cry1 - Input) |
|---|---|---|---|---|---|
| 0 | | | | | |
| 1 | 000.0000_1110_1001_000 | 000.0000_0000_0000_000 | 000.0000_0001_1101_001 | 000.0000_1111_0101_001 | 000.0000_0001_0010_000 |
| 2 | 000.0011_1110_1001_100 | 000.0000_0000_1000_000 | 000.0000_0101_0000_000 | 000.0011_0100_1111_111 | 000.0001_0010_0000_000 |
| 3 | 000.1001_1011_1111_100 | 000.0000_1000_0000_000 | 000.0000_0000_0000_000 | 000.0001_1011_1111_100 | 001.0000_0000_0000_001 |
| 4 | 000.1110_1000_0001_000 | 000.0000_1111_1101_000 | 000.0000_0000_0000_000 | 000.1110_0111_1100_000 | 000.0001_0000_0010_001 |
| 5 | 111.0101_1000_0111_000 | 000.0000_1111_0001_000 | 000.0000_0000_0000_000 | 110.0101_0111_0110_000 | 000.0001_0000_0010_000 |
| 6 | 001.0001_1100_0000_000 | 000.1000_1100_1000_000 | 000.0000_0000_0000_000 | 001.1001_1100_0000_000 | 000.0000_0010_0000_000 |
| 7 | 111.0111_1111_1111_000 | 000.0001_0000_0001_000 | 000.0000_0000_0000_000 | 111.0110_0111_1110_000 | 000.0000_0010_0000_000 |

| CSA2(qjD - Input) | Sum2 | Cry2 | PSR rR0 = b(-1)A = 000.0000_1110_1001_0 | PSR rR0 = b(-1)A = 000.0000_1110_1001_0 | PCR | Pt | q - j |
|---|---|---|---|---|---|---|---|
| 000.0000_0000_0000_000 | | | | 000.0000_1110_1001_0 | 000.0000_000_0000 | 000.0000 | q(-1) = 0 |
| 000.0000_0000_0000_000 | 000.0000_1110_0110_001 | 000.0000_0001_0000_000 | | 000.0011_1001_1000_1 | 000.0000_1000_0000 | 000.0011 = 0.1875 | q(-2) = 0 |
| 000.0000_0000_0000_000 | 000.0001_0110_1111_111 | 000.0001_0000_0000_000 | | 000.1001_1011_1111_1 | 000.1000_0000_0000 | 001.0001 = 1.0625 | q(-3) = 1 |
| 111.0010_0001_1111_111 | 110.1101_1010_0000_010 | 001.0000_0000_1111_101 | | 000.1110_1000_0001_1 | 000.0000_1111_1101 | 000.1110 = 0.875 | q(-4) = 1 |
| 111.0010_0001_1111_111 | 111.1101_0110_0001_110 | 000.0010_0001_0001_000 | | 111.0101_1000_0110_0 | 001.0000_1111_0001 | 000.0101 = 0.3125 | q(-5) = 0 |
| 000.0000_0000_0000_000 | 100.0100_0111_0100_000 | 010.0001_0000_0000_000 | | 001.0001_1000_1101_0 | 000.1000_0001_000C | 001.1001 = 1.5625 | q(-6) = 2 |
| 110.0100_0011_1111_111 | 111.1101_1101_1111_110 | 000.0000_0010_0000_001 | | 111.1000_1111_1111_0 | 000.0001_0000_0001 | 111.1000 = -0.5 | q(-7) = -1 |
| 000.1101_1101_1110_0000_000 | 111.1001_1001_1100_000 | 000.0110_0010_0000_000 | | 110.0110_0111_0000_0 | 011.0011_0001_0000 | | |

*Fig. 7*

| Iteration i # | CSA1 (PS-Input) | CSA1 (PS-Input) | CSA1(bjA¹/r - Input) b(-i-1)*A/r | CSA2(Sum1 - Input) | CSA2(Cry1 - Input) |
|---|---|---|---|---|---|
| 0 | | | | | |
| 1 | 0000.000_1110_1001_000 | 0000.000_0000_0000_000 | 0000.000_0001_1101_001 | 0000.000_1111_0100_001 | 0000.000_0000_0000_000 |
| 2 | 0000.011_1001_1000_100 | 0000.000_1000_0000_000 | 0000.000_0101_0111_011 | 0000.011_0100_1111_111 | 0000.000_0000_0000_000 |
| 3 | 0001.001_1011_1111_100 | 0001.000_0000_0000_000 | 0000.000_0000_0000_000 | 0000.001_1011_1111_100 | 0010.000_0000_0000_001 |
| 4 | 0001.110_1000_0001_000 | 0000.000_1111_1101_000 | 0000.000_0000_0000_000 | 0000.110_0111_1100_000 | 0000.001_0000_0000_001 |
| 5 | 1110.101_1000_0111_000 | 0000.000_1111_0001_000 | 0000.000_0000_0000_000 | 1100.101_0111_0110_000 | 0100.001_0000_0010_000 |
| 6 | 0010.001_1101_0000_000 | 0000.000_0001_0000_000 | 0000.000_0000_0000_000 | 0011.001_1100_0000_000 | 0000.000_0010_0000_001 |
| 7 | 1110.111_0111_1111_000 | 0000.001_0000_0001_000 | 0000.000_0000_0000_000 | 1110.110_0111_1110_000 | 0000.010_0000_0010_000 |

| CSA2(qjD - Input) | Sum2 | Cry2 | | PSR rR0 = b(-i-1)A = | PCR | Pt | q - j |
|---|---|---|---|---|---|---|---|
| 0000.000_0000_0000_000 | | | | 000.0000_1110_1001_0 | 000.0000_000_0000 | 000.0000 | q(-1) = 0 |
| 0000.000_0000_0000_000 | 0000.000_1110_0110_001 | 0000.000_0001_0000_000 | | 0000.011_1001_1000_1 | 0000.000_1000_0000 | 0000.01 = 0.25 | q(-2) = 0 |
| 1110.010_0001_1111_111 | 1111.101_1111_1111_111 | 0010.000_0000_0000_010 | | 0001.001_1011_1111_1 | 0001.000_0000_0000 | 0010.00 = 2.0 | q(-3) = 1 |
| 1110.010_0001_1111_111 | 1111.101_1111_1111_111 | 0010.000_0000_1111_101 | | 1110.110_1000_0001_0 | 0000.000_1111_1101 | 0001.11 = 1.75 | q(-4) = 1 |
| 0000.000_0001_1111_111 | 1000.100_0111_0110_110 | 0000.010_0000_0001_110 | | 1110.101_1000_0111_0 | 0010.000_1111_0001 | 0000.10 = 0.5 | q(-5) = 0 |
| 1100.100_0000_0000_000 | 1111.101_1101_0010_000 | 0000.000_0010_0000_000 | | 0010.001_1101_0000_0 | 0001.000_0001_0000 | 0011.00 = 3.0 | q(-6) = 2 |
| 0000.000_0001_1111_110 | 1111.001_0110_1100_000 | 0000.000_0010_0010_000 | | 1110.111_0111_1111_0 | 0110.011_0001_0000 | 1110.11 = -1.25 | q(-7) = -1 |
| 0001.101_1110_0000_000 | 1111.001_1001_1100_000 | 0000.110_0110_0010_000 | | 1100.110_0111_0000_0 | | | |

*Fig. 8*

HIGH-RADIX MULTIPLIER-DIVIDER

CROSS-REFERENCE TO RELATED APPLICATION

This application is a continuation-in-part of U.S. patent application Ser. No. 11/819,749, filed Jun. 28, 2007.

BACKGROUND OF THE INVENTION

1. Field of the Invention

The present invention relates to high performance digital arithmetic circuitry, and more particularly to a high-radix multiplier-divider implemented in hardware for efficiently computing combined multiplication and division operations, e.g., computing ((A·B)÷D), as well as modulo multiplication, e.g., (A·B) mod D.

2. Description of the Related Art

Many of the recent computer intensive applications, e.g., multimedia and public-key cryptosystems, have been witnessing a continuous increase in demand for more computational power. For example, public-key cryptosystems make heavy use of the modulo multiplication operation, which comprises a multiplication operation together with a division/reduction operation. The key size of RSA public-key cryptosystems has been continuously getting larger, from 512 bits to 1024 bits, and most recently to 2048 bits, causing increased demand for more computational power. There exists a quite extensive literature that describes the theory and design of high speed multiplication and division algorithms. Division algorithms are divided into five classes: (1) digit recurrence; (2) functional iteration; (3) very high radix; (4) table lookup; and (5) variable latency.

Digit recurrence is the oldest class of high speed division algorithms, and, as a result, a significant quantity of literature has been written proposing digit recurrence algorithms, implementations, and techniques. The most common implementation of digit recurrence division in modern processors has been the Sweeney, Robertson, Tocher (SRT) method.

Digit recurrence algorithms retire a fixed number of quotient bits in every iteration. Implementations of digit recurrence algorithms are typically low complexity, utilize small area, and have relatively large latencies. The fundamental choices in the design of a digit recurrence divider are the radix, the allowed quotient digits, and the representation of the partial remainder (residue). The radix determines how many bits of quotient are retired in an iteration, which fixes the division latency. Larger radices can reduce the latency, but increase the time for each iteration. Judicious choice of the allowed quotient digits can reduce the time for each iteration, but with a corresponding increase in complexity and hardware. Similarly, different representations of the partial remainder (residue) can reduce iteration time, but with corresponding increases in complexity.

Digit recurrence division algorithms use iterative methods to calculate quotients one digit per iteration. SRT is the most common digit recurrence division algorithm. The input operands are represented in a normalized floating point format with w-bit significands in sign and magnitude representation. Assuming floating point representation, the algorithm is applied only to the magnitudes of the significands of the input operands. Techniques for computing the resulting exponent and sign are straightforward. The most common format found in modern computers is the IEEE 754 standard for binary floating point arithmetic. This standard defines single and double precision formats.

In a division operation (N/D), N is a 2 w-bit dividend, while D is a w-bit divisor. The division result is a w-bit quotient Q ($Q = 0 \cdot q_{-1} q_{-2} \ldots q_{-n}$) and a w-bit remainder R such that $N = QD + R$ and $|R| < |D|$. The w-bit quotient is defined to consist of n radix-r digits with $r = 2^m$, ($w = n \times m$). A division algorithm that retires m quotient bits per iteration is said to be a radix-r algorithm. Such an algorithm requires n iterations to compute the result. For no overflow, i.e., so that Q is w-bits, the condition $|N| < |D|$ must be satisfied when dividing fractions. The following recurrence is used in every iteration of the SRT algorithm;

$$R_j = rR_{j-1} - q_{-j}D \; j = 1, 2, 3, \ldots, n; \text{ where}$$

$R_0 = N$
$D = \text{divisor}$,
$N = \text{dividend}$, and
$R_j$ is the partial residue at the $j^{th}$ iteration.

One quotient digit (m-bits) is retired each iteration using a quotient digit selection function SEL where: $q_{-j} = \text{SEL}(rR_{j-1}, D)$.

After n iterations, the final value of the quotient Q and the remainder R are computed from $R_n$ as follows:

if $R_n > 0$, then $Q = \sum_{j=1}^{n} q_{-j} r^{-j}$ and $R = R_n r^{-n}$ else $\left( Q = \sum_{j=1}^{n} q_{-j} r^{-j} \right) - r^{-n}$ where $r^{-n}$ is 1 in the least significant position, or $Q = \left( \sum_{j=1}^{n} q_{-j} r^{-j} \right) - ulp$ where $ulp$ designates a unit in the least significant position and $R = (R_n + D) r^{-n}$.

The critical path of the basic SRT digit recurrence algorithm comprises the following steps: (1) determination of the next quotient digit $q_{-j}$ using the quotient digit selection function, a look-up table typically implemented as a PLA, or read only memory (ROM); (2) generation of the product $q_{-j}D$; and (3) subtraction of $Q_{-j}D$ from the shifted partial residue $rR_{j-1}$. Each of these steps contributes to the algorithm cost and performance.

A common method to decrease the overall latency of the algorithm (in machine cycles) is to increase the radix r of the algorithm. Assuming the same quotient precision, the number of iterations of the algorithm required to compute the quotient is reduced by a factor f when the radix is increased from $r = 2^m$ to $r = 2^{mf}$. For example, a radix-4 algorithm retires two bits of quotient in every iteration. Increasing to a radix-16 algorithm allows for retiring four bits in every iteration, halving the latency.

This reduction does not come for free. As the radix increases, the quotient-digit selection becomes more complicated and, accordingly, slower to compute. Since the quotient selection logic is on the critical path of the basic algorithm, using higher radices causes the total cycle time of the division iteration to increase. The number of cycles, however, is reduced for higher radices. As a result, the total time required to compute a w-bit quotient may not be reduced as expected. Furthermore, the generation of divisor multiples may become impractical or infeasible for higher radices. Thus, these two factors can offset some of the performance gained by using higher radices.

Typically, for a system with radix r, a redundant signed digit set ($D_a$) is used to increase the performance of the algorithm. To be redundant, the size of the digit set should be greater than r, including both negative and positive digits. Thus, $q_{-j} \epsilon D_\alpha = \{-\alpha, -\alpha+1, \ldots, -1, 0, 1, \ldots, \beta-1, \beta\}$, where the number of allowed digits ($\alpha+\beta+1$) is greater than r. It is fairly common to choose a symmetric digit set where $\alpha=\beta$, in which case the size of the digit set ($2\alpha+1$)>r, which implies that a must satisfy the condition $\alpha \geq \lceil r/2 \rceil$. The degree of redundancy is measured by the value of the redundancy factor h, where $h=\alpha/r_{-1}$. Redundancy is maximal when $\alpha=r-1$, in which case h=1, while it is minimal when $\alpha=r/2$ (i.e., $\frac{1}{2} < h \leq 1$).

For the computed $R_j$ value to be bounded, the value of the quotient digit must be selected such that $|R_j| < hD$. Using larger values of h (i.e., large $\alpha$) reduces the complexity and latency of the quotient digit selection function. This, however, results in a more complex generation of the divisor multiples. Divisor multiples that are powers of two can be formed by simple shifting, while those that are not powers of two (e.g., three) require additional add/subtract steps. The complexity of the quotient digit selection function and that of the generating divisor multiples must be balanced.

To define the quotient digit selection function, a containment condition is used to determine the selection intervals. A selection interval is the region defined by the values of the shifted partial residue ($rR_{j-1}$) values and the divisor (D) in which a particular quotient digit may be selected. The selection interval is defined by the upper ($U_k$) and lower ($L_k$) bounds for the shifted partial residue ($rR_{j-1}$) values in which a value of quotient digit $q_j=k$ may be selected to keep the partial residue $R_j$ bounded. These are given by:

$$U_k = (h+k)D$$

and $$L_k = (-h+k)D.$$

The P-D diagram is a useful tool in defining the quotient-digit selection function. It plots the shifted partial residue ($P=rR_{j-1}$) versus the divisor D. The $U_k$ and $L_k$ straight lines are drawn on this plot to define selection interval bounds for various values of k. FIG. 6 shows a P-D diagram for the case where r=4 and $\alpha=2$ ($h=\frac{2}{3}$). The shaded regions are the overlap regions where more than one quotient digit may be selected. Table I shows representative values of the upper and lower bounds $U_k$ and $L_k$ for the permissible values of the quotient digit k.

TABLE I

Upper and Lower Bounds vs. Quotient Digit

| k | $U_k = (h+k)D$ | $L_k = (-h+k)D$ |
|---|---|---|
| -2 | -4/3D | -8/3D |
| -1 | -1/3D | -5/3D |
| 0 | 2/3D | -2/3D |
| 1 | 5/3D | 1/3D |
| 2 | 8/3D | 4/3D |

There is a need for a digital multiplier-divider unit that can efficiently compute $$S = \left(\frac{A \cdot B}{D}\right)$$

where the multiplicand A, the multiplier B, and the divisor D are w-bit unsigned numbers. Computing S yields a w-bit quotient and a w-bit remainder R such that:

$$A \cdot B = Q \cdot D + R$$

and $$|R| < |D|.$$

Conventionally, S would be computed using two independent operations: a multiplication operation, and a division operation. Whereas digit recurrence relations for these two operations have been proposed and are in common use by digital processors, no single recurrence relation has been proposed to simultaneously perform the multiplication and division operations as needed to efficiently compute $$S = \left(\frac{AB}{D}\right).$$

Thus, a high-radix multiplier-divider solving the aforementioned problems is desired.

SUMMARY OF THE INVENTION

The high-radix multiplier-divider provides a system and method utilizing an SRT digit recurrence algorithm that provides for simultaneous multiplication and division using a single recurrence relation. When A, B, D and Q are fractions (e.g., $Q=0 \cdot q_{-1} q_{-2} \ldots q_{-n}$), then the algorithm provides for computing $$S = \frac{AB}{D}$$

to yield a w-bit quotient Q and w-bit remainder R by: (1) determining the next quotient digit $q_{-j}$ using a quotient digit selection function; (2) generating the product $q_{-j}D$; and (3) performing the triple addition of $rR_{j-1}$, $(-q_{-j}D)$ and $$b_{-(j-1)}\left(\frac{A}{r}\right)$$

where $R_0 = b_{-1} A r^{-1}$. The recurrence relation may be implemented with carry-save adders for computation using bitwise logical operators (AND, OR, XOR).

These and other features of the present invention will become readily apparent upon further review of the following specification and drawings.

BRIEF DESCRIPTION OF THE DRAWINGS

FIG. 2 is chart showing an exemplary multiplier-divider operation according to the present invention.

FIG. 7 is a table showing a set of solution steps in a high-radix multiplier-divider according to the present invention.

FIG. 8 is a continuation of the table of FIG. 7 showing the set of solution steps in a high-radix multiplier-divider according to the present invention.

Similar reference characters denote corresponding features consistently throughout the attached drawings.

DETAILED DESCRIPTION OF THE PREFERRED EMBODIMENTS

Figure 1:
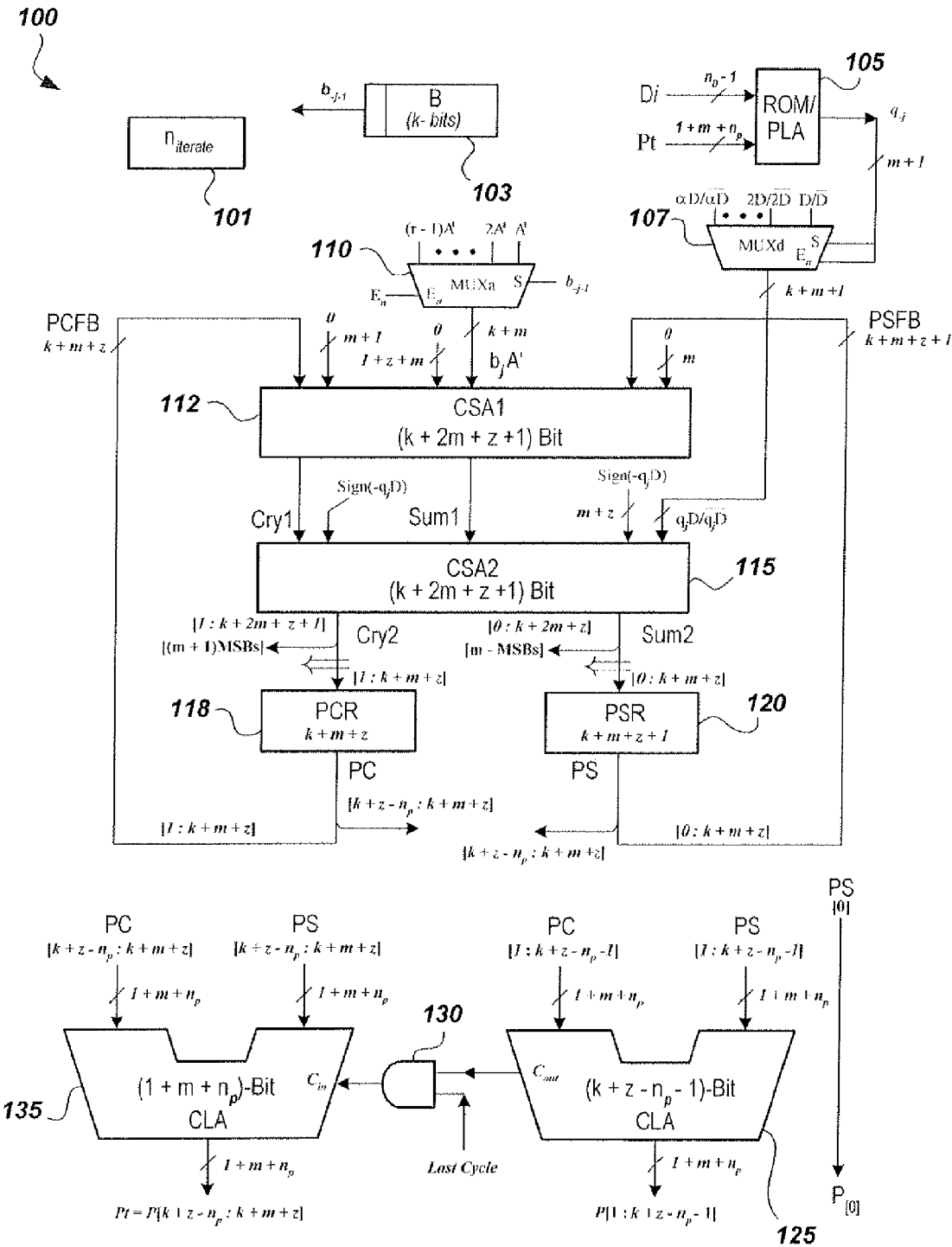
FIG. 1 is a block diagram of an exemplary circuit implementing a high-radix multiplier-divider according to the present invention.

The present invention provides a digit recurrence (SRT) multiplier-divider apparatus and method that utilizes a single recurrence relation. The method includes an algorithm that may be implemented in software, but is preferably implemented in hardware for greater speed.

The apparatus includes a circuit configured to carry out the algorithm. The circuit may be incorporated into the architecture of a computer processor, into a security coprocessor integrated on a motherboard with a main microprocessor, into a digital signal processor, into an application specific integrated circuit (ASIC), or other circuitry associated with a computer, electronic calculator, or the like. The method may be modified so that the circuit may include carry-propagate adders, or the circuit may include carry-save adders, or it may include compressors, e.g., (4-2) compressors.

The method can perform simultaneous multiplication and division. Both the apparatus and the method may be utilized in a variety of applications, including but not limited to, networked computers, public-key cryptosystems, multimedia applications, digital communication devices, and the like, where the method and circuitry provide for high speed performance of modular arithmetic operations involved in the encryption and decryption of messages, where the method and the circuitry provide increased speed for greater circuit efficiency, increased productivity, and lower network, processor, system overload and costs.

It is desired to provide a digital multiplier-divider unit that can efficiently compute $$S = \left(\frac{A \cdot B}{D}\right)$$

where the multiplicand A, the multiplier B, and the divisor D are w-bit unsigned numbers. Computing S yields a w-bit quotient Q and a w-bit remainder R such that:

$$A \cdot B = Q \cdot D + R; \quad (1)$$

$$|R| < |D|. \quad (2)$$

In one embodiment, in order to speed-up the computation $$S = \left(\frac{A \cdot B}{D}\right),$$

the recurrence relation of the present invention uses a high radix $r=2^m$ where $m \geq 1$. The operands A, B, and D are n-digit integers, i.e., $A=(a_{n-1}, \ldots a_1, a_0)$, $B=(b_{n-1}, \ldots b_1, b_0)$, and $D=(d_{n-1}, \ldots d_1, d_0)$, where $$n = \left\lceil \frac{w}{m} \right\rceil$$

and $a_i, b_i, d_i \in \{0, 1, \ldots, r-1\}$.

Thus, the present invention provides for an enhanced multiply-divide recurrence relation given by:

$$R_j = rR_{j-1} - q_{n-j}Dr^n + b_{n-j-1}Ar^{n-1} \quad j=1, 2, \ldots, n \quad (3)$$

where,
$q_i$ is the $i^{th}$ quotient digit
$b_i$ is the $i^{th}$ digit of B
$b_{-1}=0$,
$R_j$ is the $j^{th}$ running partial remainder and
$R_0 = b_{n-1}Ar^{n-1}$.
The final quotient Q and remainder R results are given by:

$$Q = q_{n-1}q_{n-2} \ldots q_2q_1q_0, \text{ i.e., } Q = \sum_{j=0}^{n-1} q_j r^j. \quad (4)$$

If $R_n < 0$ then the following correction step is performed:
$Q=Q-ulp$, where ulp designates a unit in the least significant position,
and $R_n = R_n + D$, with $$R = \frac{R_n}{r^n} \quad (5)$$

The following shows that executing the n iterations of the proposed recurrence relation yields the desired Q & R values as defined by equations (1) and (2):

$$R_j = rR_{j-1} - q_{n-j}Dr^n + b_{n-j-1}Ar^{n-1}$$

$$R_0 = b_{n-1}Ar^{n-1}$$

$$R_1 = r^n b_{n-1}A - q_{n-1}Dr^n + r^{n-1}b_{n-2}A$$

$$= A(r^n b_{n-1} + r^{n-1}b_{n-2}) - Dr^n q_{n-1}$$

$$R_2 = A(r^{n+1}b_{n-1} + r^n b_{n-2}) - Dr^{n+1}q_{n-1} - q_{n-2}Dr^n + b_{n-3}Ar^{n-1}$$

$$= A(r^{n+1}b_{n-1} + r^n b_{n-2} + r^{n-1}b_{n-3}) - D(r^{n+1}q_{n-1} + r^n q_{n-2})$$

$$R_3 = A(r^{n+2}b_{n-1} + r^{n+1}b_{n-2} + r^n b_{n-3} + r^{n-1}b_{n-4}) -$$

$$D(r^{n+2}q_{n-1} + r^{n+1}q_{n-2} + r^n q_{n-3})$$

$$\vdots$$

$$R_n = A\sum_{i=1}^{n+1} r^{2n-i} b_{n-i} - D\sum_{j=1}^{n} r^{2n-j} q_{n-j} \text{ with } b_{-1}=0,$$

$$R_n = r^n(AB - DQ).$$

Accordingly, $$R = \frac{R_n}{r^n} = AB - DQ$$

and accordingly, $$AB = DQ + R.$$

If the digits of Q are chosen such that the magnitude of the partial residue $R_j$ is maintained less than the magnitude of D, then Q is effectively the required quotient of the division operation: AB/D. Since AB=DQ+R and |R|<|D|, then R is indeed the division operation final remainder.

The previous recurrence relation (equation 3) can be rewritten assuming A, B, D, and Q to be fractions of the form $B = 0 \cdot b_{-1} b_{-2} \ldots b_{-n}$, and $Q = 0 \cdot q_{-1} q_{-2} \ldots q_{-n}$. This does not change the computation procedure in any way, and integer operations can be readily mapped to the fractional form. The fractional formulas are more convenient in mathematical representation, however, since they are readily adaptable to floating point representations. The fractional form is obtained from the integer form as follows:

$$A = A_{integer} * r^{-n}$$

$$B = B_{integer} * r^{-n}$$

$$D = D_{integer} * r^{-n}$$

$$R = R_{integer} * r^{-n}. \quad (6)$$

Following is the modified fractional multiply-divide recurrence relation:

$$R_j = rR_{j-1} - q_{-j}D + b_{-j-1}Ar^{-1} \quad \text{for } j = 1, 2, \ldots, n \quad (7)$$

where, $$R_0 = b_{-1}Ar^{-1}$$

$$b_{-i} = 0 \text{ for } i > n \quad (8)$$

$$Q = 0.q_{-1}q_{-2} \ldots q_{-n}, \text{ i.e., } Q = \sum_{j=1}^{n} q_{-j}r^{-j} \quad (9)$$

$$R = \frac{R_n}{r^n}. \quad (10)$$

Alternatively, the same recurrence relation may be used with $R_0 = 0$. In this case, an extra iteration step of the recurrence relation is needed. Thus;

$$R_j = rR_{j-1} - q_{-j}D + b_{-j-1}Ar^{-1} \text{ for } j = 1, 2, \ldots, n+1 \quad (11)$$

$$R_0 = 0$$

$$q_0 = 0$$

$$b_{-i} = 0 \text{ for } i > n$$

$$R_{n+1} = r^n R. \quad (12)$$

The final quotient Q and remainder R are given by:

$$Q = 0.q_{-1}q_{-2} \ldots q_{-n}, \text{ i.e., } Q = \sum_{j=1}^{n} q_{-j}r^{-j} \quad (13)$$

$$R = \frac{R_{n+1}}{r^n}. \quad (14)$$

The previous formulae can be implemented in hardware using shift and add operations. Although the operand size is w-bits (w=mn), the minimum possible size in radix r (r=$2^m$) implementation is w+2 m+1; w-bits for the actual operand, m-bits for the left shift required by the first term ($rR_{j-1}$), another m-bits for the right shift required by the third term ($b_{-j}Ar^{-1}$), and finally one extra bit for the sign. FIG. 2 shows an 8-bit binary example 200 (r=2, m=1, and w=n=8) of the multiplier-divider. This example follows exactly the recurrence relation, with the "(shifted)" lines indicating the shifted partial remainders ($rR_{j-1}$). Note that the integer operands were mapped to their fractional form by simply multiplying each input operand by $2^{-w}$. Hereinafter, fractional operands are assumed, with the understanding that integer operations can be directly mapped to the fractional form. The width of the operation is 8+2*1+1=11 bits. The quotient digits (bits in this case) were chosen such that the remainder will always lie in the range (−D, +D) and not just [0, +D). Allowing negative remainders can cause the selected quotient digit to be negative. Additionally, in the example of FIG. 2, since all operands (A, B and D) are positive, the final remainder should be positive as well. Since we are allowing negative remainders (with magnitude less than D), we may require a final correction step if the final remainder turns out to be negative. According to the present invention, the correction step adds the divisor D to the partial remainder $R_n$ with a corresponding correction to the quotient value by subtracting 1 in the least significant bit position, which is typically referred to as "unit in the least position", or ulp.

Just as in the case of division, we must have AB<D to guarantee that no overflow may occur (since AB=DQ+R).

The following analysis assumes the use of equations 7-10 with the understanding that similar analysis holds true if the alternative formulae of equations 11-14 are used instead.

Referring to the recurrence relation of equation (7), each iteration includes the following steps: (1) determining the next quotient digit $q_{-j}$ using some quotient digit selection function ($q_{-j}$=SEL($rR_{j-1}$, D)), which may typically be implemented as a look-up table or as a PLA; (2) generating the product $q_{-j}D$; and (3) performing the triple addition of $rR_{j-1}$, ($-q_{-j}D$) and $$b_{-(j+1)}\left(\frac{A}{r}\right).$$

The resulting partial residue ($R_j$) must guarantee that $|R_j|<|D|$. Satisfaction of the condition $|R_j|<|D|$ depends on the proper choice of the quotient digit ($q_{-j}$).

When performing a multiply-divide operation, we are adding a multiple of the input operand A in each step. The resulting residue thus obtained ($R_j$) cannot be known as predictably as in the case of high radix division. However, we may still restrict the value range of ($R_j$) by placing some restrictions on the value of A. One possible restriction is to impose the constraint that $|A|<|D|$. This restricts the range of $R_j$ as follows:

Let $A = \omega D$ where, $\omega < 1$.

$$R_j = rR_{j-1} - q_{-j}D + b_{-j-1}A r^{-1}$$

Since Max($b_i$)=(r−1), we have:

$$R_{jmax}(q_{-j}) = rR_{j-1} - q_{-j}D + \left(\frac{r-1}{r}\right)\omega D, \text{ or}$$

-continued
$$R_{jmax}(q_{-j}) = rR_{j-1} - q_{-j}D + \omega TD \text{ where,}$$
$$T = \left(\frac{r-1}{r}\right) < 1, \text{ and } \omega < 1$$
$$= R_{j(division)} + \omega TD,$$

where $R_{j(division)}$ is the residue of a regular high radix division. This shows that the deviation in the remainder curve of the Robertson diagram from the case of pure division can be as high as $$\left(\frac{r-1}{r}\right)\omega D.$$

The minimum value of $R_j$, however, is independent of A and is given by:

$$R_{j\,min}(q_{-j}) = rR_{j-1} - q_{-j}D = R_{j(division)}.$$

Since $$\omega = \left(\frac{A}{D}\right)$$

its upper bound value given by $A_{max}/D_{min}$ must be less than 1.

To guarantee satisfaction of this constraint, a pre-processing step shifting A by z-bits to the right is performed. Thus, if the input operand is A' processing is actually performed on $A=A'/2^z$ rather than the input operand A' itself. Accordingly, the method of the present invention computes $S=AB/D$ and a post-processing step will finally compute $S'=A'B/D=S*A'/A=S2^z$. For floating point number representation, an x-bit normalized signific and will result in a ratio of $A_{max}/D_{min}$ that equals $[2-2^{-(x-1)}]$ and accordingly, the upper bound of $\omega$ is given by:

$$\omega \leq \frac{A_{max}/D_{min}}{2^z} = \frac{2(1-2^{-nm})}{2^z} < 2^{1-z}.$$

Since for typical values of n and m, the quantity $(1-2^{-nm}) \ll 1$, we define the parameter $\omega_{max}=2^{1-z}$ as the upper bound for $\omega$ such that $\omega < \omega_{max}$ where:

$$\omega_{max}=2^{1-z} \leq 1. \tag{15}$$

The multiply-divide recurrence relation can be implemented in hardware using shift and add operations. Although the problem size is w bits (w=nm), the minimum possible size in radix-r implementations is $[(n+2)m+z+1]$ bits where $r=2^m$. Referring to the high-radix multiplier-divider recurrence relation (equation 7), a total of n-digits are needed to accommodate the input operand size, two more digits are needed to account for the left and right shifts ($rR_{j-1}$ & $b_{-j-1}Ar^{-1}$), z extra bits are needed since computations are performed on the constrained parameter A ($A=A'/2^z$) rather than the input operand A', and a sign bit is required, since the partial residue $R_j$ may be either positive or negative.

Multiplication-division can alternately be performed using a dedicated w×w multiplier producing the 2 w-bit product A×B followed by a dedicated divider to divide the resulting product by D. In addition to the dedicated w×w multiplier, the divider hardware requires adders of $[2w+m+1]$ bits. As an example, consider the case of w=52 bits and r=16 (i.e., m=4 and n=13), with a value of z=8 the multiplier-divider of the present invention requires adders of only 69-bits. The alternate solution of using a dedicated multiplier followed by dedicated conventional divider hardware requires both a 52×52 multiplier, and a divider which uses adders of 109-bits. Furthermore, with floating point input operands, the merged operation of multiplication-division of the present invention requires only one rounding operation. The alternate solution with a dedicated multiplication operation followed by a division operation requires two rounding operations.

Due to the pre-processing step where the input operand A' is shifted right by Z bit positions, i.e., $A=A'/2^z$, a post-processing step where the result S is shifted left by Z bit positions is needed, i.e., $S'=S2^z$. In other words, since the resulting quotient and remainder values (Q & R) satisfy the relation AB=QD+R, i.e., $(A'*2^{-z})B=QD+R$, the true quotient Q' and remainder R' that satisfy A'B=Q'D+R' are computed in a post-processing step by:

$$Q'=Q*2^z,$$

and $$R=R*2^z.$$

Thus, it is expected that the first Z bits of the resulting quotient (Q) will be zeros. Accordingly, if n-significant digits of Q' are required, the number of required iterations of the recurrence relation (equation 7) must be raised to $$n+\left\lceil\frac{Z}{m}\right\rceil.$$

To define the quotient digit selection function, we need to determine the upper and lower bounds of the shifted partial residue ($P=rR_{j-1}$) for which a given quotient digit value may be selected such that $|R_j|<|D|$. The assumptions under which these bounds can be derived are:
1. $R_j$ is kept bounded, i.e., $|R_j|<|D|$, by defining the negative and positive range limiting factors $h^-$ and $h^+$ such that:

$$-h^-D \leq R_j \leq +h^+D \text{ where } h^-, h^+ < 1.$$

2. The radix r is a power of 2, i.e., $r=2^m$.
3. The magnitude of A is smaller than the magnitude of D ($A=\omega D$), where $\omega < \omega_{max}=2^{1-z} \leq 1$).
4. The operand B is represented in nonredundant binary format with radix r digits, i.e., $0 \leq b_i \leq r-1$. The analysis can be easily extended to accommodate signed-digit representations of B.
5. A balanced signed redundant quotient digit set $D_q$ is used where:

$$D_q=\{-\alpha,-\alpha+1,\ldots,-1,0,1,\ldots,\alpha-1,\alpha\},$$

with $$r/2 \leq \alpha \leq (r-1).$$

6. For the $j^{th}$ iteration, a valid choice of $q_{-j}$ is one which satisfies the condition $-h^-D \leq R_j \leq +h^+D$ where $h^-, h^+ < 1$.

For a feasible implementation of the high-radix multiplier-divider recurrence relation (equation 7), when the shifted partial residue $rR_{j-1}$ equals its maximum value ($rh^+D$) and $b_{-j-1}$ is also maximum ($=r-1$), a value of $q_{-j}=\alpha$ should guarantee that $R_j \leq h^+D$), thus:

$$\left(rh^+D - \alpha D + \frac{r-1}{r}\omega D \ldots\right) \leq h^+D, \text{ then}$$

$$\alpha \geq (r-1)\left(h^+ + \frac{\omega}{r}\right).$$

Alternatively, we can write $$h^+ \leq \frac{\alpha}{r-1} - \frac{\omega}{r}.$$

By replacing $\omega$ by $\omega_{max}$ in the above equation, we obtain a lower bound expression for $h^+$ that guarantees satisfaction of the constraint $R_j \leq h^+D$. Thus, $h^+$ is taken as:

$$h^+ = \frac{\alpha}{r-1} - \frac{\omega_{max}}{r}. \quad (16)$$

Equation 16 clearly shows that the upper bound for $\alpha$ is $(r-1)$, in which case $$h^+ = \left(1 - \frac{\omega_{max}}{r}\right).$$

Likewise, when the shifted partial residue $rR_{j-1}$ equals its minimum value ($-rh^-D$) and $b_{-j-1}$ is also minimum ($=0$), a value of $q_{-j}=-\alpha$ should guarantee that $R_j \geq -h^-D$, thus:

$$(-rh^-D + \alpha D + 0) \geq -h^-D$$

$$\therefore \alpha \geq (r-1)h^-$$

Alternatively, we can write: $h^- \geq \alpha/(r-1) < 1$.

Thus, to guarantee satisfaction of the constraint $R_j \geq -h^-D$ and for maximum overlap regions on the P-D diagram (and accordingly simpler quotient digit selection logic), we use the highest value for $h^-$ given by:

$$h^- = \frac{\alpha}{(r-1)} = h \quad (17)$$

where h is the redundancy factor, and we can re-write the equation of $h^+$ as follows:

$$h^+ = \frac{\alpha}{(r-1)} - \frac{\omega_{max}}{r} = h - \frac{\omega_{max}}{r} \quad (18)$$

In a P-D diagram, we need to determine the selection interval defined by the upper ($U_k$) and lower ($L_k$) bounds of the shifted partial residue ($P=rR_{j-1}$) for which a given quotient digit value ($q_{-j}=k$) may be selected such that the next partial residue ($R_j$) satisfies $-h^-D \leq R_j \leq +h^+D$.

From equation (7), we can write $P=rR_{j-1}=R_j+q_{-j}D-b_{-j-1}Ar^{-1}$. Accordingly, we define $U_k$ as the upper bound of P ($=rR_{j-1}$) for which $q_{-j}=k$ yields a valid $R_j$ value $-h^-D \leq R_j \leq +h^+D$. Thus:

$$U_k = rR_{j-1}(q_{-j}=k) = R_{jmax} + kD - b_{(-j-1)max}Ar^{-1}, \text{ or} \quad (19)$$

$$U_k = h^+D + kD - \left(\frac{r-1}{r}\right)\omega_{max}D$$

$$U_k = (k + h - \omega_{max})D.$$

Likewise, we define $L_k$ as the lower bound of P ($=rR_{j-1}$) for which $q_{-j}=k$ yields a valid $R_j$ value $-h^-D \leq R_j \leq +h^+D$. Thus:

$$L_k = R_{jmin} + kD - b_{(-j-1)min}Ar^{-1},$$

or $$L_k = (k-h^-)D = (k-h)D. \quad (20)$$

Using all bits of P and D($2w+2m+Z+1$) bits as input to the quotient digit selection function {SEL(P, D)} requires huge ROM or PLA sizes. For example if $w=24$ bits, $r=8$ (i.e., $m=3$), and $Z=6$, the quotient digit selection function will have a minimum of 61 input bits, assuming non-redundant representation of both P and D. With such large number of input bits, the hardware complexity of the SEL function is bound to be enormous. For example, if a ROM is used to store this function, the required ROM size ($2^{61} \times 4$-bits) is prohibitively large.

Accordingly, it is advantageous to minimize the number of input bits to the quotient digit selection function. Effectively, we need to use truncated values of P and D, with the smallest possible number of bits as input to the quotient digit selection function. Let these truncated values be $P_t$ and $D_t$ and let the number of fractional bits of these parameters be $n_p$ and $n_D$, respectively. Thus, the maximum truncation error values for P and D are $2^{-np}$ and $2^{-nD}$ respectively. Using a 2's complement representation, the introduced truncation errors are always positive, i.e., $P \geq P_t$ and $D \geq D_t$. We now derive expressions for the optimal values of $n_p$, $n_D$ and z in terms of the radix r, the redundancy factor h, and the digit set $\alpha$.

Thus, the selection function defines for each interval of the divisor D [$d_i$, $d_{i+1}$), where $d_{i+1}=d_i+2^{-nD}$, comparison constants $m_k(i)$ within the overlap region for all values of $k \in \{-(\alpha-1), -(\alpha-2), \ldots, -1, 0, +1, \ldots, +\alpha\}$. Since P is represented in the 2's complement system, then $P \geq P_t$. Accordingly, any given value of $P_t$ represents a range of P that is defined by: $P_t \leq P < P_t + 2^{-nP}$. Likewise, $D \geq D_t$. Accordingly, any given value of $D_t$ represents a range of D that is defined by $D_t \leq D < D_t + 2^{-nd}$.

The set of comparison constants for each range of D is determined such that a given value of P is compared to these constants, based upon which a proper value of $q_{-j}$ is chosen. Thus, for the $i^{th}$ range of D, define the comparison constants $m_k(i)[k=-(\alpha-1), (\alpha-2), \ldots, -1, 0, 1, \ldots, +\alpha]$ such that:

IF $m_k(i) \leq P \leq m_{k+1}(i)$ then $q_{-j}=k$. (21)

The P-D diagram is used to help determine these comparison constants. The comparison constants $m_k(i)$ are chosen within the overlap regions where a choice of a $q_{-j}$ value of either k or k-1 satisfies the constraint $-h^-D \leq R_j \leq +h^+D$. Since any value within the overlap region may be used as a comparison constant for this region, the choice should be made such that ($n_p+n_D$) is minimized.

Figure 3:
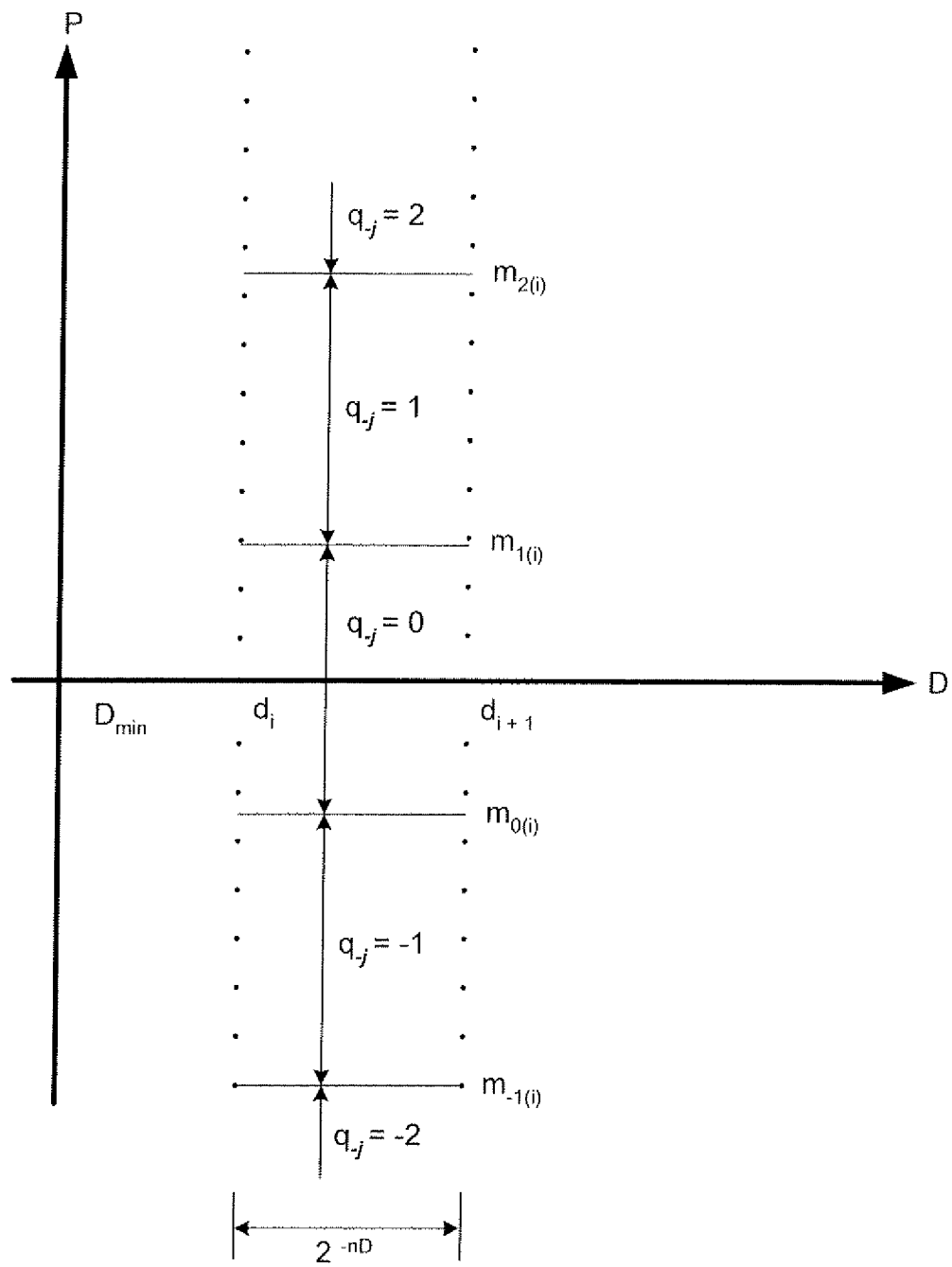
FIG. 3 is a comparison constants graph defining quotient digit values in a high-radix multiplier-divider according to the present invention.

FIG. 3 shows on a P-D diagram 300 the comparison constants $m_{k(i)}$ for a given truncated divisor value $D_t=d_i$. As shown in FIG. 3, proper values of the quotient digit for various ranges of P values for the case of $r=4$ and $\alpha=2$ can be determined from the P-D diagram 300.

Two conditions must be satisfied when determining the comparison constants: (1) containment, where $L_k \leq m_k \leq U_k$; and (2) continuity, so that if $P=(m_k-2^{-nP})$, then $q_{-j}$ must equal k-1, which implies that $m_k-2^{-nP} \leq U_{k-1}$. Written differently, we must have $m_k \leq U_{k-1} + 2^{-nP}$ as well as satisfy the containment constraint. Accordingly, $m_k$ should satisfy $L_k \leq m_k \leq U_{k-1} + 2^{-nP}$.

For a given value of $P_t$, the uncertainty in the value of P has an upper bound of $\Delta P = 2^{-nP}$, i.e., $P_t \leq P < P_t + \Delta P$; accordingly, the upper bound for $m_k$ must be reduced by $\Delta P$ and accordingly $m_k$ should satisfy:

$$L_k \leq m_k \leq U_{k-1}. \tag{22}$$

For a feasible $m_k$ value, the height of the overlap region ($\Delta y$) at a given divisor value (D) must be greater than or equal to the minimum grid $2^{-nP}$; thus $\Delta y = U_{k-1} - L_k = (2h - 1 - \omega_{max})D$. At $D = D_{min}$, the height of the overlap region $\Delta y$ is minimum ($\Delta y_{min}$), defining the upper bound for $2^{-nP}$, i.e., $$\Delta y_{min} = U_{k-1} - L_k = (2h - 1 - \omega_{max})D_{min} > 2^{-nP} \tag{23}$$

or $$2^{nP} \geq \frac{1}{(2h - 1 - \omega_{max})D_{min}}.$$

For a feasible solution, we must have $\omega_{max} < (2h-1)$, i.e., $$2^z > 1/(h - 0.5).$$

Thus, the minimum value of $n_p$ is given by:

$$n_P(\min) = \left\lceil \text{Log}_2 \frac{1}{(2h - 1 - \omega_{max})D_{min}} \right\rceil \tag{24}$$

$$n_P(\min) = \lceil -\text{Log}_2(2h - 1 - \omega_{max}) - \text{Log}_2(D_{min}) \rceil$$

where $$h = \alpha/r - 1.$$

The lower bound of $n_p(\min)$ is reached at very high values of Z ($Z \to \infty$), in which case ($\omega_{max} \to 0$) and is given by:

$$n_P(\text{Low\_Bound}) = \left\lceil \text{Log}_2 \frac{1}{(2h - 1)D_{min}} \right\rceil. \tag{25}$$

We define $Z_1$ as the value of Z at which $n_p(\min)$ is equal to its lower bound value as follows:

$$Z_1 = 1 + \left\lceil \text{Log}_2 \left\{ \frac{1}{2h - 1 - \left( \frac{2^{-n_P(\text{Low\_Bound})}}{D_{min}} \right)} \right\} \right\rceil \tag{26}$$

to determine the overlap region between $U_{k-1}$ and $L_k$, based upon which we define the comparison constants that determine the value of the next quotient digit $q_{-j}$ (it should be noted that the negative (P<0) and positive (P>0) overlap regions are not symmetric, and should be considered independently).

Figure 4:
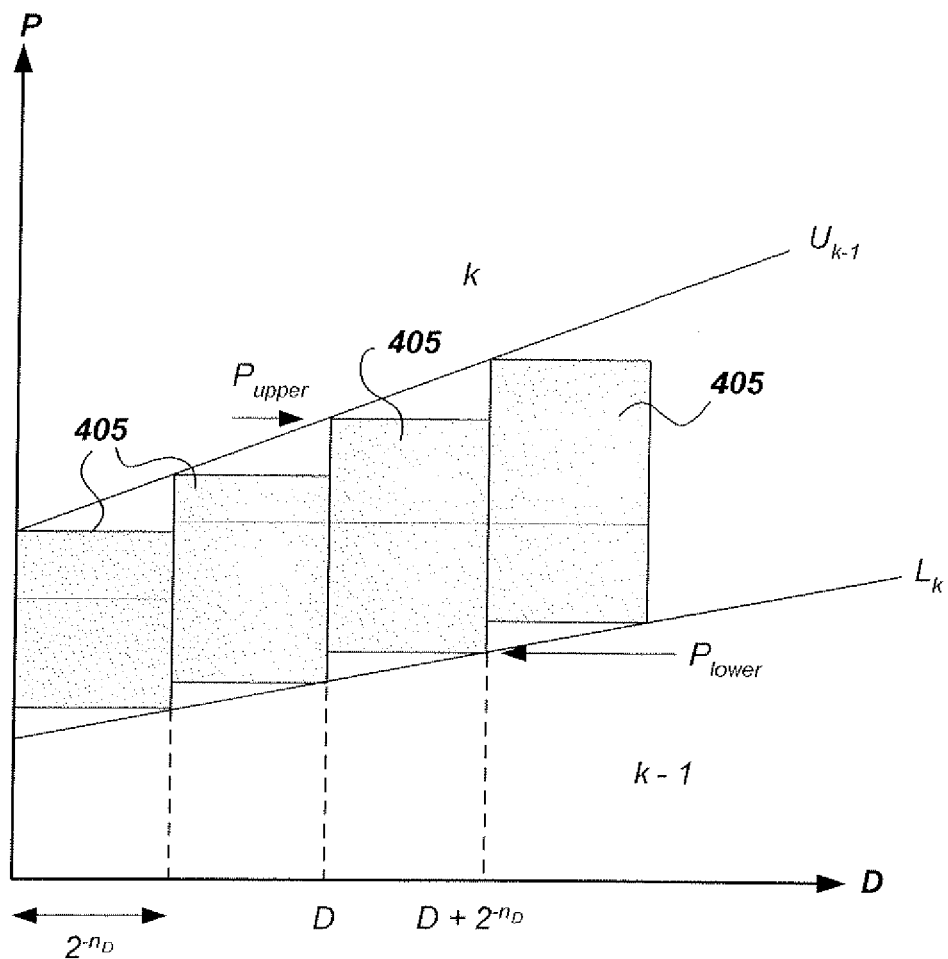
FIG. 4 is a P-D diagram showing overlap regions for P>0 in a high-radix multiplier-divider according to the present invention.

The overlap region for a given divisor value, D, is the range of P values where the next quotient digit $q_{-j}$ may be assigned either a value of k−1 or k yielding a value of the next partial residue ($R_j$) which satisfies the range constraint $-h^-D \leq R_j \leq +h^+D$ in either case. As defined by equation (22), this range is bounded between $U_{k-1}$ and $L_k$. FIG. 4 shows part of the P-D diagram 400 for P>0 and the overlap region where we can select $q_{-j} \in \{k-1, k\}$. The comparison constant $m_k(i)$ falls in the overlap region 405 between $U_{k-1}$ and $L_k$ for the $i^{th}$ divisor range [D:D+$2^{-nD}$). The lower and upper bound values ($P_{lower}$ & $P_{upper}$) for this comparison constant are given by:

$$P_{lower} = L_k(D + 2^{-nD}) = (k - h)(D + 2^{-nD}) \ 1 \leq k \leq \alpha \tag{27}$$

$$P_{upper} = U_{k-1}(D) = (k + h - 1 - \omega_{max})D. \ 1 \leq k \leq \alpha \tag{28}$$

Thus, the selection constants $m_k(i)$ are determined for the P>0 range such that $m_k(i)$ is an integer multiple of $2^{-nP}$ and:

$$(k - h)(D + 2^{-nD}) \leq m_k \leq (k + h - 1 - \omega_{max})D \ 1 \leq k \leq \alpha$$

$$\text{PositiveOverlap}_k = \Delta y^+ = P_{upper} - P_{lower} \geq 0 \tag{29}$$

$$\Delta y^+ = (2h - 1 - \omega_{max})D - (k - h)2^{-nD} \geq 0 \ 1 \leq k \leq \alpha \tag{30}$$

Figure 5:
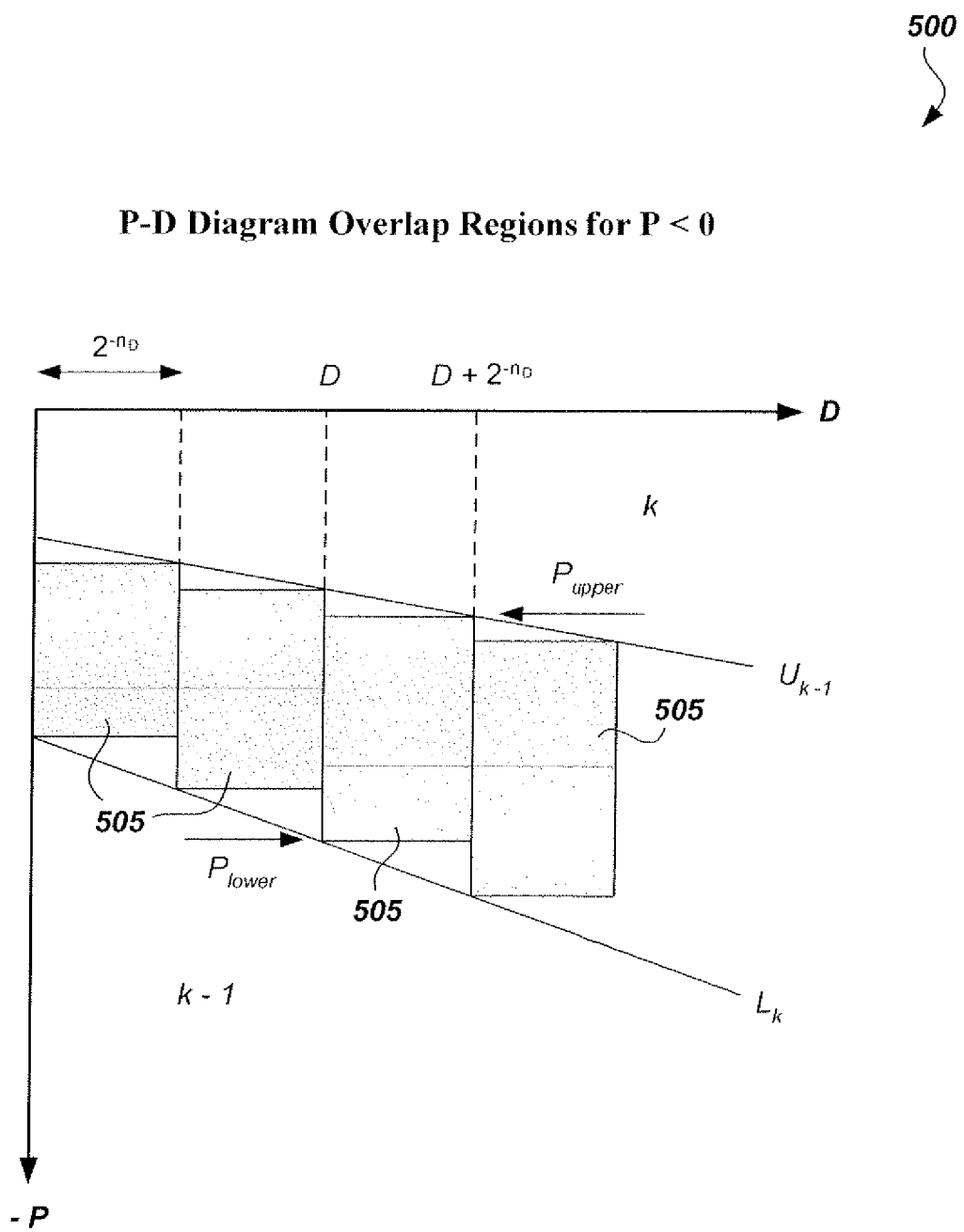
FIG. 5 is a P-D diagram showing overlap regions for P<0 in a high-radix multiplier-divider according to the present invention.
Figure 6:
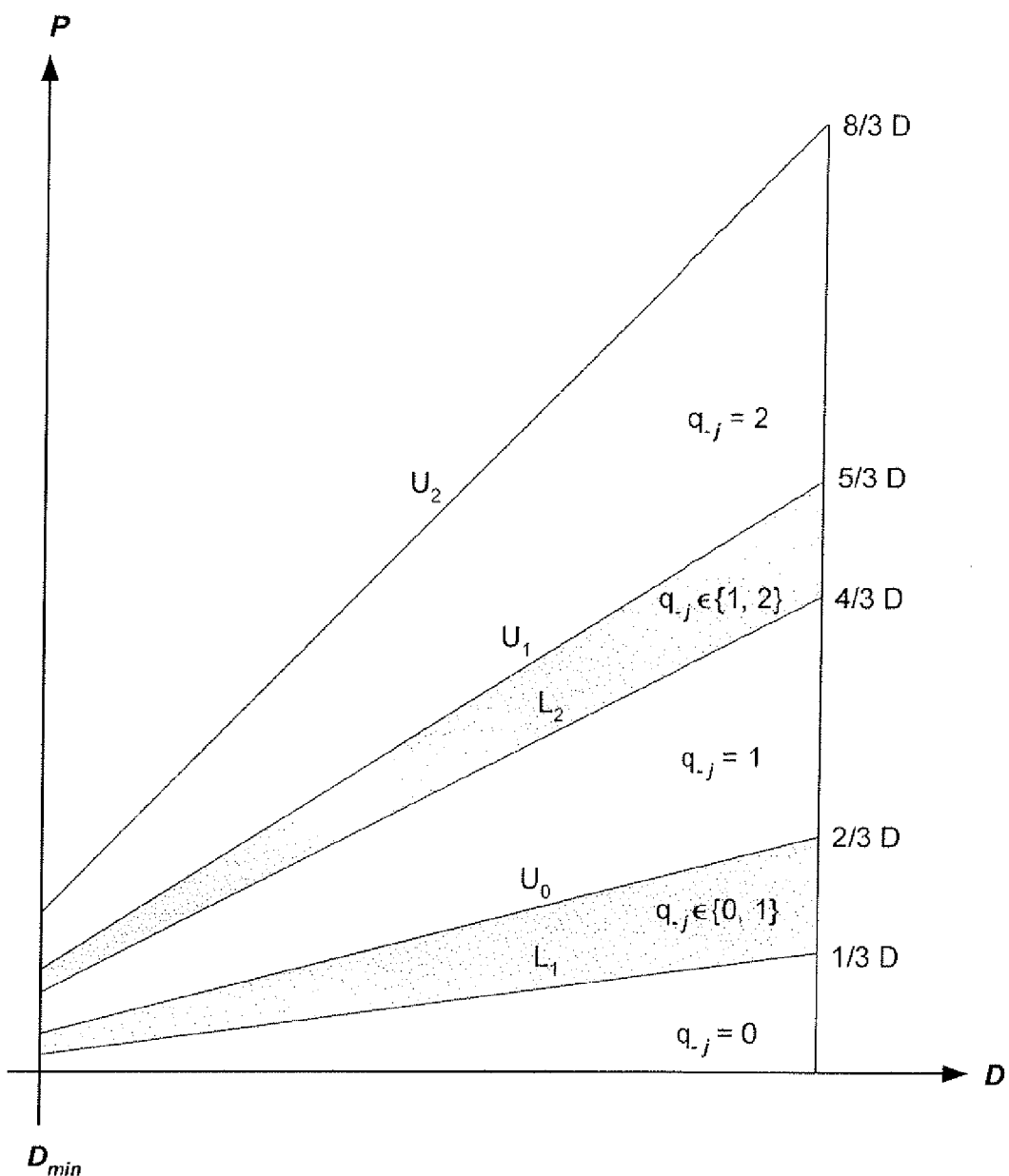
FIG. 6 is a P-D diagram for P>0 with specified r and alpha values according to the prior art.

For negative overlap regions where P<0, shown in the diagram 500 of FIG. 5, the following equations hold:

$$P_{lower} = L_k(D) = (k - h)D - (\alpha - 1) \leq k \leq 0 \tag{31}$$

$$P_{upper} = U_{k-1}(D + 2^{-nD}) = (k + h - 1 - \omega_{max})(D + 2^{-nD}) - (\alpha - 1) \leq k \leq 0 \tag{32}$$

Thus, the selection constants $m_k(i)$ are determined for the P<0 range such that $m_k(i)$ is an integer multiple of $2^{-nP}$ and:

$$(k - h^-)D \leq m_k \leq (k + h - 1 - \omega_{max})(D + 2^{-nD})$$

$$\text{NegativeOverlap}_k = \Delta y^- = P_{upper} - P_{lower} \geq 0$$

$$\Delta y^- = (2h - 1 - \omega_{max})D + (k + h - 1 - \omega_{max})2^{-nD} \geq 0 \tag{33}$$

$$-(\alpha - 1) \leq k \leq 0. \tag{34}$$

Valid $m_{k(i)}$ are shown in the shaded regions 505. It should be understood that the present invention contemplates an overlap range ($\Delta y^+$ or $\Delta y^-$) that is smaller for smaller values of D. Higher values of |k| yield smaller overlap regions for both $\Delta y^+$ and $\Delta y^-$. For worst case analysis, the smallest value of D (i.e., $D_{min}$) and the highest value of |k| (k=$\alpha$ for $\Delta y^+$ or k=$-(\alpha-1)$ for $\Delta y^-$) should be used to yield the minimum overlap. Additionally, worst case analysis is performed on $\Delta y^-$ (k=$-(\alpha-1)$, D=$D_{min}$), since this is where the overlap region is smallest. This yields the following relations:

$$2^{nD} \geq \frac{(\alpha - h + \omega_{max})}{(2h - 1 - \omega_{max})D_{min}} \tag{35}$$

$$n_D(\min) = \left\lceil \text{Log}_2 \left\{ \frac{(\alpha - h - \omega_{max})}{(2h - 1 - \omega_{max})D_{min}} \right\} \right\rceil. \tag{36}$$

The lower bound of $n_D$ is reached at very high values of Z ($Z \to \infty$) in which case ($\omega_{max} \to 0$) and is given by:

$$n_D(\text{Low\_Bound}) = \left\lceil \text{Log}_2 \left\{ \frac{(\alpha - h)}{(2h - 1)D_{min}} \right\} \right\rceil. \tag{37}$$

We define $Z_2$ as the value of Z at which $n_D(\min)$ is equal to its lower bound value as follows:

$$Z_2 = 1 + \left\lceil \text{Log}_2 \left\{ \frac{(1 + D_{min} 2^{n_d(\text{Low\_Bound})})}{D_{min} 2^{n_D(\text{Low\_Bound})}(2h - 1) - \alpha + h} \right\} \right\rceil. \tag{38}$$

The value of Z to be used is the maximum of either $Z_1$ or $Z_2$, i.e., $$Z = \text{MAX}(Z_1, Z_2). \tag{39}$$

Carry-Save Adders (CSAs) may be used to evaluate the partial residue ($R_j$) of the recurrence relation, in which case $R_j$ is represented in a redundant form as two quantities; a sum and a carry. Assuming 2's complement number representation, and using only $n_p$ fractional bits, the truncation error is always positive. A fast carry-propagate adder (CPA) may be used to add the most significant bits of the CSA, which may be used as input to the quotient digit selection function.

Assuming $n_p$ to be the number of fractional bits of P used as input to the CPA, the error introduced due to the use of CSA's is less than $2^{-n_P}$. In this case, the upper bound for the comparison constants should be reduced by the same amount, and accordingly equation (22) is modified for CSA's to become:

$$L_k \leq m_k \leq U_{k-1} - 2^{-n_p}.$$

The overlap region for a given divisor value, D, is the range of P values where the next quotient digit $q_{-j}$ may be assigned either a value of k−1 or k, yielding a value of the next partial residue ($R_j$) which satisfies the range constraint $-h^-D \leq R_j \leq +h^+D$. FIG. 4 shows part of the P-D diagram for P>0 and the overlap region where we can select $q_{-j} \in \{k-1, k\}$. The comparison constant $m_k(i)$ falls in the overlap region between ($U_{k-1} - 2^{-n_P}$) and $L_k$ for a given divisor range [D: D+$2^{-n_D}$). The lower and upper bound values ($P_{lower}$ & $P_{upper}$) for this comparison constant are given by:

$$P_{lower} = L_k(D+2^{-n_D}) = (k-h)(D+2^{-n_D}) \quad 1 \leq k \leq \alpha \quad (40)$$

$$P_{upper} = U_{k-1}(D) = (k+h-1-\omega_{max})D - 2^{-n_P} \quad 1 \leq k \leq \alpha \quad (41)$$

On the other hand, when P<0, the bounds are:

$$P_{lower} = L_k(D) = (k-h)D - (\alpha-1) \leq k \leq 0 \quad (42)$$

$$P_{upper} = U_{k-1}(D+2^{-n_D}) = (k+h-1-\omega_{max})(D+2^{-n_D}) - 2^{-n_P} - (\alpha-1) \leq k \leq 0 \quad (43)$$

Comparing heights of the overlap regions for CSA's (equations 40-43) and CPA's (equations 31-34), it can be seen that the overlap region height for CSA's is lower by $2^{-n_p}$ due to the lowered upper boundary of this region ($P_{upper}$) by the same amount.

With CSA's, the selection constants $m_k(i)$ are determined such that $m_k(i)$ is an integer multiple of $2^{-n_p}$ and:

$$(k-h)(D+2^{-n_D}) \leq m_k \leq (k+h-1-\omega_{max})D - 2^{-n_P} \quad 1 \leq k \leq \alpha$$
$$(P>0)$$

$$(k-h)D \leq m_k \leq (k+h-1-\omega_{max})(D+2^{-n_D}) - 2^{-n_P} - (\alpha-1) \leq k \leq 0$$
$$(P<0)$$

To derive mathematical expressions for optimal parameter values, we consider the worst case overlap region, i.e., $\Delta y_{min}^-$, at the smallest value of D (i.e., $D_{min}$) and the most negative value of k (i.e., $k=-(\alpha-1)$).

$$\Delta y_{min}^- = (2h-1-\omega_{max})D_{min} > 2^{-n_P} - (\alpha-h+\omega_{max})2^{-n_D} \geq 0 \quad (44)$$

$$2^{n_D} \geq \frac{a-h+\omega_{max}}{[2h-1-\omega_{max}]D_{min} - 2^{-n_P}} \quad (45)$$

To have a feasible solution, the denominator of equation (45) must be greater than zero. Thus:

$$2^{-n_P} < [2h-1-\omega_{max}]D_{min}, \quad (46)$$

and $$n_P(\min) = \left\lceil \text{Log}_2 \frac{1}{(2h-1-\omega_{max})D_{min}} \right\rceil$$

Thus, the minimum feasible value of $n_P$ is given by:

$$n_P(\min) = \left\lceil \text{Log}_2 \frac{1}{(2h-1-2^{1-z})D_{min}} \right\rceil \quad (47)$$

The lower bound of the minimum $n_P$ is reached at very high values of z ($z \rightarrow \infty$) and is given by:

$$n_P(\text{Low\_Bound}) = \left\lceil \text{Log}_2 \frac{1}{(2h-1)D_{min}} \right\rceil. \quad (48)$$

Let $z_1$ be the minimum value of z at which $n_{p(min)} = n_P(\text{Low\_Bound})$, thus:

$$z_1 = \left\lceil 1 - \text{Log}_2 \left\{ 2h - 1 - \frac{2^{-n_P(\text{Low\_Bound})}}{D_{min}} \right\} \right\rceil. \quad (49)$$

Multiplying both sides of equation (45) by $2^{n_P}$ $$2^{n_P+n_D} \geq \frac{\alpha - h + \omega_{max}}{D_{min}[2h-1-\omega_{max}]2^{-n_P} - 2^{-2n_P}}. \quad (50)$$

To reduce the complexity of the quotient digit selection hardware, ($n_P+n_D$) must be minimized or, equivalently, the value of $2^{n_P+n_D}$ must be minimized. Defining $Y = 2^{n_P+n_D}$ and $X = 2^{-n_P}$, equation (50) is rewritten as $$Y \geq \frac{\alpha - h - \omega_{max}}{D_{min}[2h-1-\omega_{max}]X - X^2}. \quad (51)$$

Differentiating equation (51) with respect to X and equating $$\frac{\partial Y}{\partial X} = 0,$$

we get:

$$X = 2^{-n_P} = \frac{1}{2}[(2h-1-\omega_{max})D_{min}] = (h - 0.5 - 2^{-t})D_{min}. \quad (52)$$

Thus, $$n_p(opt) = 1 + \left\lceil \text{Log}_2 \frac{1}{[2h-1-\omega_{max}]D_{min}} \right\rceil. \quad (53)$$

In general, $$\text{Log}_2 \frac{1}{[2h-1-\omega_{max}]D_{min}}$$

yields a non-integer value. Accordingly, the actual optimal $n_p$ value may be either the rounded up or rounded down to the integer value nearest to the value computed by equation (53). Since equation (53) yields a value for $n_p$ that is higher only by 1 than the minimum $n_p$ value defined by equation (46), it is clear that the optimal $n_p$ value may either equal the minimum value specified by equation (46), or it may be larger by just one bit. The optimum no value may be computed from equation (45):

$$2^{n_D} \geq \frac{2(\alpha - h + \omega_{max})}{[2h - 1 - \omega_{max}]D_{min}} \qquad (54)$$

$$n_D(opt) = 1 + \lceil \text{Log}_2\{\alpha - h + \omega_{max}\} - \text{Log}_2\{[2h - 1 - \omega_{max}]D_{min}\}\rceil$$

The lower bound of the optimal $n_D$ value is reached at very high values of z ($z \to \infty$) and is given by:

$$n_D(\text{Low\_Bound}) = 1 + \lceil \text{Log}_2\{\alpha - h\} - \text{Log}_2\{(2h-1)D_{min}\}\rceil. \qquad (55)$$

Let $z_2$ be the minimum value of z at which $n_D(opt) = n_D$ (Low_Bound), Using equation (54), $z_2$ can be derived as follows:

$$z_2 = 1 + \left\lceil \text{Log}_2\left\{\frac{2^{n_D(Low\_Bound)-1}D_{min} + 1}{2^{n_D(Low\_Bound)-1}D_{min}[2h-1] - \alpha + h}\right\}\right\rceil. \qquad (56)$$

The optimal value of $z(z_{opt})$ is the larger of $z_1$ or $z_2$; thus:

$$Z_{opt} = \text{MAX}(z_1, z_2). \qquad (57)$$

The value of Z is chosen as the higher of two values, $Z_1$ and $Z_2$ that are derived from the lower bound values of $n_p$ and $n_D$. Expressions for $Z_1$ and $Z_2$ have been derived for the case where carry-propagate adders are used, as well as the case where carry-save adders are used.

Whether carry-propagate or carry-save adders are used, the value of $Z_1$ is the same, since the expressions for $n_P$(Low_Bound) and $Z_1$ are identical in both cases, as can be readily seen by comparing equations (25) and (26) on the one hand with equations (48) and (49) on the other.

For the case of carry-save adders, the low bound value of $n_D$ as given by equation (54) is higher by 1 than its value for the carry-propagate adder case as given by equation (37). Accordingly, the value of $Z_2$ for both the CPA and CSA cases as computed by equations (38) and (55), respectively, are the same.

Accordingly, the value of Z is independent of the type of adder that is used for implementation. Thus, the equations to derive Z are summarized below:

$$n_P(\text{Low\_Bound}) = \left\lceil \text{Log}_2 \frac{1}{(2h-1)D_{min}} \right\rceil$$

$$z_1 = 1 + \left\lceil \text{Log}_2\left\{\frac{1}{\left\{2h - 1 - \left(\frac{2^{-n_P(low\_Bound)}}{D_{min}}\right)\right\}}\right\}\right\rceil$$

$$n_D(\text{Low\_Bound}) = \left\lceil \text{Log}_2\left\{\frac{(\alpha - h)}{(2h-1)D_{min}}\right\}\right\rceil$$

$$Z_2 = 1 + \left\lceil \text{Log}_2\left\{\frac{(1 + D_{min}2^{n_D(Low\_Bound)})}{D_{min}2^{n_D(Low\_Bound)}(2h-1) - \alpha + h}\right\}\right\rceil$$

$$Z = \text{MAX}(Z_1, Z_2).$$

It should be noted that at $\alpha = r - 1$, the redundancy factor h=1, and the equation of $Z_1$ yields an infinite value. Likewise, the expression of $Z_2$ may yield infeasible values for certain cases, e.g., r=4 and $\alpha$=2. Table II, Table III, and Table IV show the values of $Z_1$ and $Z_2$ for several radixes r=$2^m$ at $\alpha$=r/2 (minimal redundancy), $\alpha$=r-2, and $\alpha$=r-1 (maximal redundancy).

TABLE II

Values of $Z_1$ and $Z_2$ for minimal redundancy ($\alpha$ = r/2)

| m | 2 | 3 | 4 | 5 | 6 |
|---|---|---|---|---|---|
| r = $2^m$ | 4 | 8 | 16 | 32 | 64 |
| $\alpha$ = r/2 | 2 | 4 | 8 | 16 | 32 |
| $Z_1$ | 5 | 7 | 9 | 11 | 13 |
| $Z_2$ | X | 6 | 8 | 10 | 12 |

TABLE III

Values of $Z_1$ and $Z_2$ for $\alpha$ = r − 2

| m | 2 | 3 | 4 | 5 | 6 |
|---|---|---|---|---|---|
| r = $2^m$ | 4 | 8 | 16 | 32 | 64 |
| $\alpha$ = r − 2 | 2 | 6 | 14 | 30 | 62 |
| $Z_1$ | 5 | 4 | 3 | 3 | 3 |
| $Z_2$ | X | 5 | 6 | 7 | 8 |

TABLE IV

Values of $Z_1$ and $Z_2$ for maximal redundancy ($\alpha$ = r − 1)

| m | 2 | 3 | 4 | 5 | 6 |
|---|---|---|---|---|---|
| r = $2^m$ | 4 | 8 | 16 | 32 | 64 |
| $\alpha$ = r − 1 | 3 | 7 | 15 | 31 | 63 |
| $Z_1$ | X | X | X | X | X |
| $Z_2$ | X | 4 | 5 | 6 | 7 |

The tables show that the maximum Z value occurs under minimal redundancy conditions ($\alpha$=r/2), and is equal to (2 m+1). For cases where the expression of either $Z_1$ or $Z_2$ yields an infeasible value, some choice criterion may be used to define the value of Z. For example, Z may be chosen equal to the feasible value of either $Z_1$ or $Z_2$ totally neglecting the one with infeasible value. An alternative strategy is: if $Z_1$ has an infeasible value, increment the value of $n_P$(Low_Bound) by 1 and recompute $Z_1$; or if $Z_2$ has an infeasible value, increment the value of $n_D$(Low_Bound) by 1 and recompute $Z_2$.

Alternative approaches are also possible, e.g., adopting values of the closest higher system, e.g., for the case of $Z_2$ with r=4 and $\alpha$=r−2=2, we set $Z_2$=5 corresponding to the system with r=8 and $\alpha$=r−2=6.

Based on the above developed theory, given the system radix r, and the quotient digit set parameter $\alpha$, the optimal parameters for the high-radix multiplier-divider may be determined as follows:

1 - Compute $h = \dfrac{\alpha}{r-1}$

2—Determine Z as detailed supra

3—Compute $\omega_{max} = 2^{1-z}$

4 - Compute $n_P(\min) = \left\lceil \text{Log}_2 \dfrac{1}{(2h-1-\omega_{max})D_{min}} \right\rceil$ 5—For $n_p = n_p(\min)$ To $n_p(\min)+2$, repeat:
  a. Compute $n_D(\min)$ corresponding to the current $n_p$ value (equation 45 for CSA, or equation 35 for CPA)
  b. For the current $n_p$ and $n_D$ values, repeat the following until either a solution is found or for a maximum of 3 times;
    i. Determine the comparison constants $M_k(i)^*$
    ii. if a feasible solution exists (i.e., a complete set of comparison constants is obtained) then store $n_p + n_D$, else increment $n_D$
6—Select the solution which yields the smallest $n_p + n_D$. In case of more than one solution having the same smallest $n_p + n_D$, choose the one with the smallest $n_p$.

The comparison constants $m_k(i)$ are determined to satisfy the following:
1. $m_k(i)$ is an integer multiple of $2^{-nP}$;
2. $L_k(D+2^{-n_D}) \leq m_k \leq U_{k-1}(D)$  $1 \leq k \leq \alpha$ (P>0)
3. $L_k(D) \leq m_k \leq U_{k-1}(D+2^{-n_D})$  $-(\alpha-1) \leq k \leq 0$ (P<0)
where $L_k = (k-h)D$, and
  $U_{k-1}(k+h-1-\omega_{max})D - 2^{-n_p}$ if Carry-Save Adders are used; or
  $= (k+h-1-\omega_{max}) D$ if Carry-Propagate Adders are used.

FIG. 1 shows an embodiment of the high-radix multiplier-divider 100 that utilizes carry-save adders. High-radix multiplier-divider 100 has the following features. A counter 101 is used to hold the number of iterations to be performed $$\left(n_{iterate} = \left\lceil \frac{k+Z}{m} \right\rceil\right).$$

The m most significant bits of the k-bit B-register constitute the current digit ($b_{-j-1}$) of B. In each iteration register B is shifted left by m-bits. The selection function is implemented either as a ROM 105 or a PLA where the truncated values of P and D (i.e., $P_t$ and $D_t$) are the input to this ROM 105 (or PLA) for a total of ($n_D + n_P + m$) bits. The output of the ROM/PLA 105 is the (m+1)-bit signed value of $q_{-j}$.

The value of $P(=rR_j)$ uses a redundant representation in the form of a SUM component (PS), and a CARRY component (PC), which are held in the registers PSR 120 and PCR 118, respectively. Accordingly there are four quantities that need to be added in each iteration (i.e., each execution of the recurrence relation of equation (7) $R_j = rR_{j-1} - q_{-j+1}D + b_{-j}Ar^{-1}$; namely PS, PC, $(-q_{-j}*D)$, and $(b_{-j-1}*A/r)$.

The multiplexer MUXa 110 generates the k+m bits $(b_{-j-1}*A')$, which is left appended by 1+Z+m bits of 0 value to generate the signed quantity $(b_{-j-1}*A/r)$, where $A = A'/2^z$. The multiplexer MUXd 107 generates k+m+1 bits of the signed 1's complement of the quantity $(-q_{-j}*D)$, i.e., if $q_{-j}$ is positive, $(\overline{q_{-j}D})$ is generated, while if it is negative, $(|q_{-j}|*D)$ is generated. The output of MUXd 107 is left appended by Z+m bits, each having a value that equals the sign bit of $(q_{-j}D)$ (sign-bit extension).

A Carry-Lookahead Adder 135 (CLA) is used to add the (1+m+$n_P$) most significant bits of the sum and carry components of the shifted partial residue (PS & PC). The resulting summation is the truncated $P_t$ value used as input to the ROM/PLA 105. Adding the 4 quantities PS, PC, $(-q_{-j}*D)$, and $(b_{-j-1}*A/r)$ is done using two Carry-Save adders, CSA1 112 and CSA2 115. CSA1 112 adds PS, PC, and $(b_{-j-1}*A/r)$ yielding two outputs: a partial sum component (Sum 1), and a partial carry component (Cry 1). The second CSA, CSA2 115 adds Sum1, Cry1, and $(-q_{-j}*D)$. For a correct result, the 1's complement representation of $(-q_{-j}*D)$ is turned into a 2's complement by forcing bit 0 of Cry 1 to equal the sign bit value of $(-q_{-j}*D)$. CSA2 115 yields two outputs; a partial sum component (Sum2), and a partial carry component (Cry2).

An m-bit left-shifted version of Sum2 and an m-bit left-shifted version of Cry2 are stored in two registers, PSR 120 and PCR 118 to represent ($rR_j$). The outputs of PSR 120 and PCR 118 are fed-back as input to CSA1 112, representing the shifted partial residue ($rR_j$), while the (1+m+$n_P$) most significant bits of PSR 120 and PCR 118 are added using the CLA 135 to yield the value of $P_t$.

At the last iteration, a second CLA 125 is used to assimilate the sum and carry components of the shifted partial residue (PS & PC) to yield the value of P. This CLA 125 may via last cycle AND gate 130, or, alternatively, may not utilize the (1+m+$n_P$)-bit first CLA 135 as part of it to yield the (1+m+$n_P$) most-significant bits of the result, as shown in FIG. 1.

Example 1

If Carry-Propagate Adders (CPA) are used, compute AB/D=(0.1110\_1001)*(0.10011100)/(0.1101\_1110) using radix r=4, and $D_{min}$=0.5. Let A'=0.1110\_1001, B=0.10011100, and D=0.1101\_1110.

h=2/3=0.667, $n_P$(Low\_Bound)=3, $n_D$(Low\_Bound)=3, $Z_1$=5, $Z_2$ computed at [nD(Low\_Bound)+1] is 4. Thus, Z=Max($Z_1, Z_2$)=5, $\omega_{max}=2^{-4}$=0.0625, $$n_P(\min) = \left\lceil \text{Log}_2 \frac{1}{(2h-1-\omega_{max})D_{min}} \right\rceil = 3$$

and $$n_D(\min) = \left\lceil \text{Log}_2 \left\{ \frac{(\alpha-h+\omega_{max})}{(2h-1-\omega_{max})D_{min}} \right\} \right\rceil = 4.$$

Considering the worst case of $D=D_{min}$=0.5, and computing $L_k$ and $U_{k-1}$ at various values of k, it can be shown that no solution is possible for $n_P$=3 and $n_D$=4. However, a solution exists for the case of $n_P$=3 and $n_D$=5. The table below lists the values of $L_k$ and $U_{k-1}$ for various values of k at $D=D_{min}$=0.5, in addition to possible values of the comparison constants $m_k$ for this case.

TABLE V $L_k$, $U_{k-1}$, and $m_k$ for D = $D_{min}$ = 0.5

| k | $L_k$ | $U_{k-1}$ | $m_k$ |
|---|---|---|---|
| −1 | −0.83333 | −0.74154 | −0.75 |
| 0 | −0.33333 | −0.21029 | −0.25 |
| 1 | 0.177083 | 0.302083 | 0.25 |
| 2 | 0.708333 | 0.802083 | 0.75 |

For the example at hand since $n_D$=5, the truncated value of D is given by $D_t$=0.11011=27/32. Table VI gives the computed values of $L_k$ and $U_{k-1}$ for various values of k, together with the selected values of comparison constants for the range D=27/32:28/32.

TABLE VI $L_k$, $U_{k-1}$ and $m_k$ for D = 27/32

| k | $L_k$ | $U_{k-1}$ | $m_k$ |
|---|---|---|---|
| −1 | −1.40625 | −1.22135 | −1.25 |
| 0 | −0.5625 | −0.34635 | −0.375 |
| 1 | 0.291667 | 0.509766 | 0.375 |
| 2 | 1.166667 | 1.353516 | 1.25 |

The pre-processing steps are given below:

TABLE VII

| Preliminary values | |
|---|---|
| $A = A' * 2^{-z}$ | 0.0_0000_1110_1001 |
| A/r | 000.0000_0001_1101 001 |
| A * B = | $2^{-5} * (0.1000\ 1101\ 1111\ 11)$ |

In Tables VIII and IX, below, values of $b_{-j}$ are noted as b(−1), b(−2) etc., values of $q_{-j}$ are notes as q(−1), q(−2), etc., and values of $R_j$ are noted as R0, R1, etc.

TABLE VIII

| Values of $b_{-j}$ | |
|---|---|
| b(−1) = | 2 |
| b(−2) | 1 |
| b(−3) | 3 |
| b(−4) | 0 |
| b(−5:−8) | 0 |

TABLE IX

| Calculation of $R_1$-$R_7$ and $q_{-1}$-$q_{-7}$ | | |
|---|---|---|
| Processor Size 8 + (2*2) + 5 + 1 = 18 bits | | |
| # iterations = 4 + [5/2] = 7 | | |
| R0 = b(−1)A/r | 000.0000_0011_1010_010 | |
| rR0 | 000.0000_1110_1001_000 | → q(−1) = 0 |
| +b(−2)*A/r | 000.0000 0001 1101 001 | |
| R1 | 000.0001 _0000_01 1 0_001 | |
| rR1 | 000.0100_0001_1000_100 | → q(−2) = 0 |
| +b(−3)*A/r | 000.0000 0101 0111 011 | |
| R2 | 000.0100_0110_1111_111 | |
| rR2 | 001.0001_1011_1111_100 | → q(−3) = 1 |
| −q(−3)D | 111.0010_0010_0000_000 | |
| +b(−4)*A/r | 000.0000 0000 0000 000 | |
| R3 | 000.0011_1101_1111_100 | |
| rR3 | 000.1111_0111_1110_000 | → q(−4) = 1 |
| −q(−4)D | 111.0010_0010_0000_000 | |
| +b(−5)*A/r | 000.0000 0000 0000 000 | |
| R4 | 000.0001_1001_1110_000 | |
| rR4 | 000.0110_0111_1000_000 | → q(−5) = 1 |
| ·q(−5)D | 111.0010_0010_0000_000 | |
| +b(−6)*A/r | 000.0000 0000 0000 000 | |
| R5 | 111.1000_1001_1000_000 | |
| rR5 | 110.0010_0110_0000_000 | → q(−6) = 2 |
| −q(−6)D | 001.1011_1100_0000_000 | |
| +b(−7)*A/r | 000.0000 0000 0000 000 | |
| R6 | 111.1110_0010_0000_000 | |
| rR6 | 111.1000_1000_0000_000 | → q(−7) = −1 |
| −q(−7)D | 000.1101_1110_0000_000 | |
| +b(−8)*A/r | 000.0000 0000 0000 000 | |
| R7 | 000.0110_0110_0000_000 | |

From the above, the resulting quotient may be expressed as:

$$Q=[0.00111(-2)(-1)]_4=0.0000\_0\_1010\_0011\_1=2^{-5}*(0.1010\_0011\_1)_2$$

In the foregoing, it is noted that Q has nine significant bits, whereas only eight bits are required. The remainder may be expressed as:

$$R_7=000.0110\_0110\_0000\_000$$

$$R=r^{-7}R_7=2^{-15}*(0.1100\_1100)$$

The validity of the result may be verified from the following considerations:

$$A*B=2^{-5}*(0.1000\_1101\_1111\_11)$$

$$Q*D=2^{-5}*(0.1000\_1101\_1100\_1001)$$

$$R=r^{-7}R_7=2^{-5}*2^{-10}*(0.1100\_1100)$$

$$Q*D+R=A*B=2^{-5}*(0.1000\_1101\_1111\_11)$$

Since the required accuracy is only 8 bits, a correction step is required. In the correction step, $Q=Q-ulp=2^{-5}*(0.1010\_0011)_2$.

But, AB=DQ+R=D*(Q−ulp)+(R+D*ulp).

Therefore, the corrected quotient is $Q=Q-ulp=2^{-5}*(0.1010\_0011)$ and the corrected remainder is:

$$R=R+D*ulp=2^{-15}*(0.1100\_1100)+2^{-14}*(0.1101\_1110)=2^{-13}*(0.1010\_0010)$$

In a required correction step, since the original operand is $A'=0.1110\_1001=A*2^z=A*2^5$, the actual quotient Q' and remainder R' are given by:

$$Q'=Q*2^5=0.1010\_0011$$

$$R'=R*2^5=2^{-8}*(0.1010\_0010)$$

Example 2

Using Carry-Save Adders (CSA), compute $AB/D=(0.1110\_1001)*(0.10011100)/(0.1101\_1110)$ using radix r=4, $D_{min}=0.5$.

Let A'=0.1110_1001, B=0.10011100, and D=0.1101_1110. h=⅔=0.667, $n_P$(Low_Bound)=3, $n_D$(Low_Bound)=4, $Z_1=5$, $Z_2=4$. Thus, $$Z = \text{Max}(Z1, Z2) = 5,$$

$$\omega_{max} = 2^{-4} = .0625,$$

$$n_P(\min) = \left\lceil \text{Log}_2 \frac{1}{(2h-1-\omega_{max})D_{min}} \right\rceil = 3,$$

and $$n_D(\min) = \left\lceil \text{Log}_2 \frac{(\alpha - h + \omega_{max})}{(2h-1-\omega_{max})D_{min}} \right\rceil = 4.$$

Considering the worst case of $D=D_{min}=0.5$, and computing $L_k$ and $U_{k-1}$ at various values of k, it can be shown that no solution is possible for $n_p=3$ and $n_D=4$. However, a solution exists for the case of $n_p=4$ and $n_D=6$. Table X below lists the values of $L_k$ and $U_{k-1}$ for various values of k at $D=D_{min}=0.5$, in addition to possible values of the comparison constants $m_k$ for this case.

TABLE X

| $L_k$, $U_{k-1}$, and $m_k$ for $n_P = 4$ and $n_D = 6$ | | | |
|---|---|---|---|
| k | $L_k$ | $U_{k-1}$ | $m_k(0.5)$ |
| −1 | −0.83333 | −0.78223 | −0.8125 |
| 0 | −0.33333 | −0.2666 | −0.3125 |
| 1 | 0.171875 | 0.239583 | 0.1875 |
| 2 | 0.6875 | 0.739583 | 0.6875 |

For the example at hand since $n_D=6$, the truncated value of D is given by $D_t=0.110111=55/64$. Table XI gives the computed values of $L_k$ and $U_{k-1}$ for various values of k, together with the selected values of comparison constants for the range D=55/64:56/64.

TABLE XI $L_k$, $U_{k-1}$, and $m_k$ for D = 55/64

| k  | $L_k$    | $U_{k-1}$ | $m_k(55/64)$ |
|----|----------|-----------|--------------|
| −1 | −1.43229 | −1.28385  | −1.3125      |
| 0  | −0.57292 | 0.40885   | −0.4375      |
| 1  | 0.291667 | 0.456706  | +0.4375      |
| 2  | 1.166667 | 1.316081  | 1.3125       |

Interim calculated values for each iteration are shown in the table 700 in FIG. 7. Using CPA to add PSR and PCR (as shown in FIG. 1), we obtain $R_7$=000.0110_0110_0000_000. The resulting quotient, Q, may be expressed as:

$$Q=[0.001102(-1)]_4=0.0000\_0\_1010\_0011\_1=2^{-5}*(0.1010\_0011\_1)_2$$

In the foregoing, it is noted that Q has nine significant bits, whereas only eight bits are required. The remainder may be expressed as:

$$R_7=000.0110\_0110\_0000\_000$$

$$R=r^{-7}R_7=2^{-15}*(0.1100\_1100)$$

The validity of the result may be verified from the following considerations:

$$A*B=2^{-5}*(0.1000\_1101\_1111\_11)$$

$$Q*D=2^{-5}*(0.1000\_1101\_1100\_1001)$$

$$r=r^{-7}R_7=2^{-5}*2^{-10}*(0.1100\_1100)$$

$$Q*D+R=A*B=2^{-5}*(0.1000\_1101\_1111\_11)$$

The required accuracy is 8 bits, but the computed accuracy is 9 bits. Therefore, the following correction step is needed:

$$Q=Q-ulp=2^{-5}*(0.1010\_0011)_2.$$

But, AB=DQ+R=D*(Q−ulp)+(R+D*ulp).
Therefore, the corrected quotient is $Q=Q-ulp=2^{-5}*(0.1010\_0011)$ and the corrected remainder is:

$$R=R+D*ulp=2^{-15}*(0.1100\_1100)+2^{-14}*(0.1101\_1110)=2^{-13}*(0.1010\_0010)$$

In a required correction step, since the original operand is $A'=0.1110\_1001=A*2^z=A*2^5$, the actual quotient Q' and remainder R' are given by:

$$Q'=Q*2^5=0.1010\_0011$$

$$R'=R*2^5=2^{-8}*(0.1010\_0010)$$

Example 3

Compute AB/D=(1.110_1001)*(1.001_1100)/(1.101_1110) using radix r=4, $D_{min}$=1.0 and Carry-Save Adders.
Let A'=1.110_1001, B=1.001_1100 and $$D = 1.101\_1110 = 1\frac{94}{128} = 1.734375.$$

h=⅔=0.667, $n_P$(Low_Bound)=2, $n_D$(Low_Bound)=3, $Z_1$=5, $Z_2$=4, Z=Max($Z_1$, $Z_2$)=5, $\omega_{max}=2^{-4}$=0.0625.
Considering the worst case of D=$D_{min}$=1.0, and computing $L_k$ and $U_{k-1}$ at various values of k, it can be shown that a solution exists for the case of $n_P$=3 and $n_D$=5. Table XII below lists the values of $L_k$ and $U_{k-1}$ for various values of k at D=$D_{min}$=1.0, in addition to possible values of the comparison constants $m_k$ for this case.

TABLE XII $L_k$, $U_{k-1}$, and $m_k$ for D = $D_{min}$ = 1.0

| k  | $L_k$    | $U_{k-1}$ | $m_k$   |
|----|----------|-----------|---------|
| −1 | −1.66667 | −1.56445  | −1.625  |
| 0  | −0.66667 | −0.5332   | −0.625  |
| 1  | 0.34375  | 0.479167  | 0.375   |
| 2  | 1.375    | 1.479167  | 1.375   |

For the example at hand, since $n_D$=5, the truncated value of D is given by $D_t$=1.1011=1 11/16. Table XIII gives the computed values of $L_k$ and $U_{k-1}$ for various values of k, together with the selected values of comparison constants for the range $$D = 1\frac{11}{16} : 1\frac{12}{16}.$$

TABLE XIII $L_k$, $U_{k-1}$, and $m_k$ for D = 1 11/16

| k  | $L_k$    | $U_{k-1}$ | $m_k(27/32)$ |
|----|----------|-----------|--------------|
| −1 | −2.8125  | −2.52409  | −2.625       |
| 0  | −1.125   | −0.80534  | −1.0         |
| 1  | 0.572917 | 0.894531  | 0.875        |
| 2  | 2.291667 | 2.582031  | 2.5          |

Processor size is 8+(2*2)+5+1=18 bits. The number of iterations is 4+⌈5/2⌉=7. The results of intermediate calculations per iteration are shown in the table 800 of FIG. 8.

Compared to a pure divider, the size requirements of the quotient digit selection logic may be larger in the multiplier-divider 100 due to the reduced overlap regions in its P-D diagrams. Overall, it is expected that the area of multiplier-divider 100 will be slightly larger than that of a divider only.

It should be noted that the circuit of FIG. 1 is a partial circuit and would also include, e.g., a register for storing the quotient digits selected from the lookup table 105. It will further be noted that the adder 125 of FIG. 1 may be a carry-propagate adder.

Figure 9:
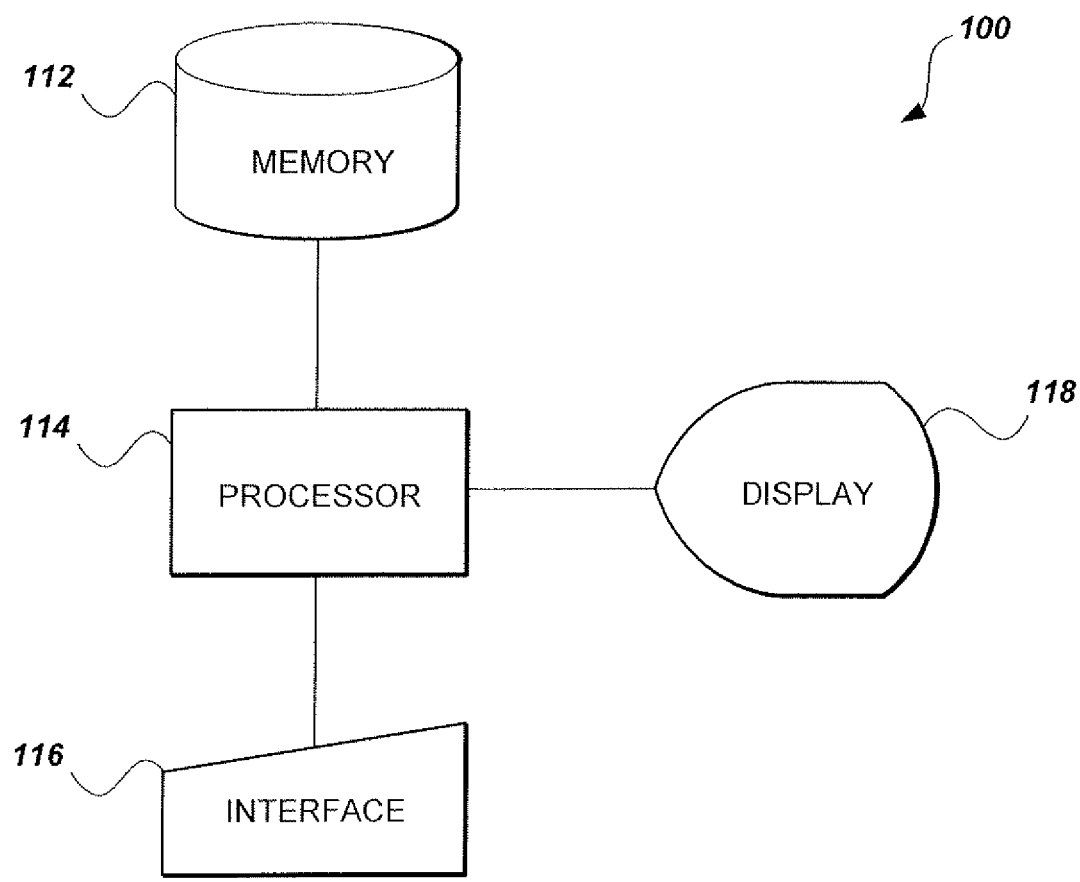
FIG. 9 is a block diagram illustrating a computer system for integrating and performing the high-radix multiplier-divider.

As noted above, the circuit may be incorporated into the architecture of a computer processor, into a security coprocessor integrated on a motherboard with a main microprocessor, into a digital signal processor, into an application specific integrated circuit (ASIC), or other circuitry associated with a computer, electronic calculator, or the like. It should be understood that the calculations may be performed by any suitable computer system, such as that diagrammatically shown in FIG. 9. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (ED), and a magnetic tape (MT). Examples of the optical disk include a DVD (Digital Versatile Disc), a DVD-RAM, a CD-ROM (Compact Disc-Read Only Memory), and a CD-R (Recordable)/RW.

It should be noted that, in the above method, the multiplicand is both arbitrary and input to the system.

It is to be understood that the present invention is not limited to the embodiment described above, but encompasses any and all embodiments within the scope of the following claims.

We claim:

1. A high-radix multiplier-divider for performing simultaneous multiplication and division in radix r of a multiplicand $A=0 \cdot a_{-1}a_{-2} \ldots a_{-n}$, a multiplier $B=0 \cdot b_{-1}b_{-2} \ldots b_{-n}$, and a divisor $D=0 \cdot d_{-1}d_{-2} \ldots d_{-n}$ so that $$\left(\frac{AB}{D}\right)$$

where AB<D, comprising:
   a plurality of registers for storing the multiplicand, the multiplier, the divisor, a quotient, and a remainder, wherein the multiplicand is an input value;
   a first data switch having a first input receiving the multiplicand right-shifted by one digit (m-bits), a second input for sequentially receiving bits from the multiplier register corresponding to digits of the multiplier from the most significant digit to the least significant digit, and an output for outputting $b_{-j-1}A_r^{-1}$ where j is a counter of the multiplier digits;
   a digital lookup table having a first input for receiving a truncated shifted partial remainder, a second input for receiving a truncated divisor, and an output for outputting a quotient digit corresponding to the truncated shifted partial remainder and truncated partial divisor, the output being stored in the quotient register and left-shifted by the radix;
   a second data switch having a first input connected to the output of the digital lookup table, a second input receiving the divisor, and an output for outputting the product of the quotient digit and the divisor; and
   an addition module having inputs for receiving the output of the first data switch and the 2's complement output of the second data switch, the addition module being configured for recursively adding the inputs for each digit of the multiplier and outputting the truncated partial remainder at each iteration for input to the digital lookup table.

2. The high-radix multiplier-divider according to claim 1, wherein said addition module comprises at least two carry-propagate addition circuits.

3. The high-radix multiplier-divider according to claim 1, wherein said addition module comprises at least two cascaded carry-save adder circuits, at least one carry-lookahead adder circuit for computing the truncated partial remainder, and at least one carry-propagate adder for adding partial sum bits and partial carry bits from the cascaded carry-save adders on the final iteration, the carry-propagate adder having an output connected to the remainder register.

4. The high-radix multiplier-divider according to claim 1, wherein said digital lookup table constrains the quotient digit so that the absolute value of the partial remainder is less than the absolute value of the divisor.

5. The high-radix multiplier-divider according to claim 1, wherein said digital lookup table comprises an area of ROM (read-only memory) having the table stored therein.

6. The high-radix multiplier-divider according to claim 1, wherein said digital lookup table comprises a programmable logic array.

7. A computer software product that includes a non-transitory storage medium readable by a processor, the non-transitory storage medium having stored thereon a set of instructions for performing high-radix multiplication and division of fractions in radix r including a multiplicand $A=0 \cdot a_{-1}a_{-2} \ldots a_{-n}$, a multiplier $B=0 \cdot b_{-1}b_{-2} \ldots b_{-n}$, and a divisor $D=0 \cdot d_{-1}d_{-2} \ldots d_{-n}$ so that $$\left(\frac{AB}{D}\right)$$

where AB<D, the instructions comprising:
   (a) a first set of instructions which, when loaded into main memory and executed by the processor, causes the processor to receive an input value of the multiplicand and initialize a partial remainder to equal $b_{-1}Ar^{-1}$;
   (b) a second set of instructions which, when loaded into main memory and executed by the processor, causes the processor to initialize an iteration counter j=1;
   (c) a third set of instructions which, when loaded into main memory and executed by the processor, causes the processor to initialize a quotient register to equal 0;
   (d) a fourth set of instructions which, when loaded into main memory and executed by the processor, causes the processor to shift the quotient register left by the radix;
   (e) a fifth set of instructions which, when loaded into main memory and executed by the processor, causes the processor to look up a quotient digit in a digital lookup table using the partial remainder and the divisor D;
   (f) a sixth set of instructions which, when loaded into main memory and executed by the processor, causes the processor to store the quotient digit in the quotient register's least significant bits;
   (g) a seventh set of instructions which, when loaded into main memory and executed by the processor, causes the processor to shift the partial remainder left by the radix;
   (h) an eighth set of instructions which, when loaded into main memory and executed by the processor, causes the processor to set the partial remainder equal to the shifted partial remainder minus the product of the quotient digit and the divisor plus the quantity $b_{-j-1}A_r^{-1}$;
   (i) a ninth set of instructions which, when loaded into main memory and executed by the processor, causes the processor to increment the counter j by one;
   (j) a tenth set of instructions which, when loaded into main memory and executed by the processor, causes the processor to repeat the fourth set of instructions through the ninth set of instructions by a number of iterations equal to the number of bits in the quotient register divided by $Log_2 r$;
   (k) an eleventh set of instructions which, when loaded into main memory and executed by the processor, causes the processor to subtract one from the quotient register and adding the divisor to the partial remainder when the partial remainder of the eighth set of instructions is negative; and (l) a twelfth set of instructions which, when loaded into main memory and executed by the processor, causes the processor to set the quotient equal to the quotient register and the remainder equal to the partial remainder.

* * * * *